United States Patent
Sagoo et al.

(10) Patent No.: US 9,547,688 B2
(45) Date of Patent: *Jan. 17, 2017

(54) METHOD OF PROVIDING SERVICE FOR USER SEARCH, AND APPARATUS, SERVER, AND SYSTEM FOR THE SAME

(71) Applicant: SAMSUNG ELECTRONICS CO., LTD., Suwon-si, Gyeonggi-do (KR)

(72) Inventors: Kiran Pal Sagoo, Seongnam-si (KR); Young-ho Rhee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/308,203

(22) Filed: Jun. 18, 2014

(65) Prior Publication Data

US 2014/0317094 A1    Oct. 23, 2014

Related U.S. Application Data

(63) Continuation of application No. 11/743,887, filed on May 3, 2007, now Pat. No. 8,788,588.

(Continued)

(30) Foreign Application Priority Data

Mar. 16, 2007  (KR) .................. 10-2007-0026064

(51) Int. Cl.
*G06F 15/16*      (2006.01)
*G06F 17/30*      (2006.01)
(Continued)

(52) U.S. Cl.
CPC ..... *G06F 17/30424* (2013.01); *G06F 17/3087* (2013.01); *G06F 17/30241* (2013.01);
(Continued)

(58) Field of Classification Search
CPC ............... G06F 17/30241; G06F 17/30424; G06F 17/3087; G06F 17/30861
(Continued)

(56) References Cited

U.S. PATENT DOCUMENTS 6,618,593 B1    9/2003  Drutman et al.
6,633,903 B1   10/2003  Gould
(Continued)

FOREIGN PATENT DOCUMENTS

JP    2001-325394 A    11/2001
JP    2001-358681 A    12/2001
(Continued)

OTHER PUBLICATIONS

Communication issued by the Korean Intellectual Property Office in counterpart Korean Application No. 10-2007-0026064 on Apr. 30, 2013.
(Continued)

*Primary Examiner* — Michael Y Won
(74) *Attorney, Agent, or Firm* — Sughrue Mion, PLLC

(57) ABSTRACT

A service provision method is provided for user search, and an apparatus, a server, and a system for the same. A service provision method includes transmitting a terminal search request message including a contents information element to a service provision server, receiving positional information of a terminal, which is playing first contents related to the contents information element, from the service provision server, and displaying the received positional information.

19 Claims, 19 Drawing Sheets

Related U.S. Application Data

(60) Provisional application No. 60/796,870, filed on May 3, 2006.

(51) Int. Cl.
*H04L 29/08* (2006.01)
*H04L 29/06* (2006.01)

(52) U.S. Cl.
CPC .... *H04L 29/0836* (2013.01); *H04L 29/08333* (2013.01); *H04L 65/403* (2013.01); *H04L 29/08657* (2013.01); *H04L 65/00* (2013.01)

(58) Field of Classification Search
USPC ............... 709/203, 212, 213, 217, 245, 248
See application file for complete search history.

(56) References Cited

U.S. PATENT DOCUMENTS

| | | | |
|---|---|---|---|
| 6,799,180 B1 | 9/2004 | McGrath et al. | |
| 7,206,841 B2 | 4/2007 | Traversat et al. | |
| 7,340,500 B2 | 3/2008 | Traversat et al. | |
| 7,450,734 B2 | 11/2008 | Rodriguez et al. | |
| 7,634,484 B2* | 12/2009 | Murata | |
| 7,653,704 B2 | 1/2010 | Gould | |
| 7,660,581 B2 | 2/2010 | Ramer et al. | |
| 7,697,731 B2* | 4/2010 | Takematsu et al. | 382/115 |
| 7,716,286 B2 | 5/2010 | Heins et al. | |
| 7,720,037 B2* | 5/2010 | Bill | 370/338 |
| 7,752,643 B2* | 7/2010 | Ito et al. | 725/50 |
| 7,877,082 B2* | 1/2011 | Eagle et al. | 455/414.1 |
| 7,890,581 B2 | 2/2011 | Rao et al. | |
| 7,890,889 B2 | 2/2011 | Artman et al. | |
| 7,921,042 B2* | 4/2011 | Jacobi et al. | 705/26.7 |
| 7,945,848 B2 | 5/2011 | Kasperkiewicz et al. | |
| 8,051,130 B2 | 11/2011 | Logan et al. | |
| 8,055,675 B2 | 11/2011 | Higgins et al. | |
| 8,064,894 B1* | 11/2011 | Bill | 455/418 |
| 8,103,590 B2* | 1/2012 | Quoc et al. | 705/52 |
| 8,116,808 B2 | 2/2012 | Amine | |
| 8,135,725 B2* | 3/2012 | Schachter | 707/758 |
| 8,140,570 B2 | 3/2012 | Ingrassia et al. | |
| 8,156,118 B2* | 4/2012 | Kalasapur et al. | 707/733 |
| 8,275,764 B2* | 9/2012 | Jeon et al. | 707/721 |
| 8,281,027 B2 | 10/2012 | Martinez et al. | |
| 8,295,851 B2* | 10/2012 | Finnegan et al. | 455/456.1 |
| 8,306,922 B1* | 11/2012 | Kunal et al. | 705/319 |
| 8,355,711 B2 | 1/2013 | Heins et al. | |
| 8,386,620 B2* | 2/2013 | Chatterjee | 709/228 |
| 8,452,855 B2 | 5/2013 | Higgins et al. | |
| 8,539,359 B2* | 9/2013 | Rapaport et al. | 715/751 |
| 8,762,472 B2* | 6/2014 | Weinstein et al. | 709/206 |
| 8,868,538 B2* | 10/2014 | Mital et al. | 707/708 |
| 8,909,771 B2* | 12/2014 | Heath | 709/224 |
| 8,935,265 B2* | 1/2015 | Tang | 707/754 |
| 8,996,507 B2* | 3/2015 | Rechis | G06F 17/3087 707/709 |
| 2001/0037325 A1 | 11/2001 | Biderman et al. | |
| 2002/0023010 A1* | 2/2002 | Rittmaster et al. | 705/26 |
| 2002/0103876 A1* | 8/2002 | Chatani et al. | 709/217 |
| 2004/0014457 A1 | 1/2004 | Stevens | |
| 2004/0143644 A1* | 7/2004 | Berton et al. | 709/217 |
| 2004/0143836 A1 | 7/2004 | McCormack et al. | |
| 2004/0225635 A1 | 11/2004 | Toyama et al. | |
| 2004/0260761 A1 | 12/2004 | Leaute et al. | |
| 2005/0004903 A1 | 1/2005 | Tsuda | |
| 2005/0080764 A1* | 4/2005 | Ito | 707/1 |
| 2005/0138137 A1* | 6/2005 | Encarnacion et al. | 709/217 |
| 2005/0228860 A1* | 10/2005 | Hamynen | G06F 17/30241 709/203 |
| 2005/0288036 A1* | 12/2005 | Brewer | H04W 8/18 455/456.2 |
| 2006/0041663 A1 | 2/2006 | Brown et al. | |
| 2006/0074883 A1 | 4/2006 | Teevan et al. | |
| 2006/0109083 A1 | 5/2006 | Rathus et al. | |
| 2006/0173838 A1* | 8/2006 | Garg | G06Q 30/02 |
| 2007/0033531 A1* | 2/2007 | Marsh | 715/738 |
| 2007/0060099 A1 | 3/2007 | Ramer et al. | |
| 2007/0073837 A1 | 3/2007 | Johnson-McCormick et al. | |
| 2007/0124721 A1 | 5/2007 | Cowing et al. | |
| 2007/0174243 A1 | 7/2007 | Fritz | |
| 2007/0203644 A1 | 8/2007 | Thota et al. | |
| 2007/0226315 A1* | 9/2007 | Espelien | 709/217 |
| 2007/0294294 A1 | 12/2007 | Aarnio et al. | |
| 2008/0010119 A1* | 1/2008 | Oliveira et al. | 705/14 |
| 2008/0065622 A1* | 3/2008 | Goto | G06F 3/0481 |
| 2008/0104227 A1* | 5/2008 | Birnie | H04W 4/02 709/224 |
| 2008/0155057 A1* | 6/2008 | Khedouri et al. | 709/217 |
| 2008/0188261 A1* | 8/2008 | Arnone | 455/550.1 |
| 2008/0229222 A1* | 9/2008 | Kake | G06F 3/0481 715/764 |
| 2008/0275865 A1 | 11/2008 | Kretz et al. | |
| 2008/0294603 A1* | 11/2008 | Ranjan | H04W 4/02 |
| 2009/0319940 A1* | 12/2009 | Flake et al. | 715/781 |
| 2009/0328087 A1 | 12/2009 | Higgins et al. | |
| 2010/0125632 A1* | 5/2010 | Leonard | 709/204 |
| 2010/0169331 A1* | 7/2010 | Karidi | G06F 17/30864 707/754 |
| 2010/0250601 A1* | 9/2010 | Takata | H04N 9/8205 707/780 |
| 2011/0126233 A1 | 5/2011 | Scott et al. | |
| 2011/0137976 A1* | 6/2011 | Poniatowski et al. | 709/203 |
| 2011/0161409 A1 | 6/2011 | Nair et al. | |
| 2011/0225153 A1* | 9/2011 | Haseyama | G06F 17/3002 707/736 |
| 2011/0289098 A1* | 11/2011 | Oztaskent et al. | 707/769 |
| 2012/0150948 A1* | 6/2012 | Ban | 709/203 |
| 2012/0296974 A1 | 11/2012 | Tabe | |
| 2013/0185355 A1* | 7/2013 | Tseng | H04L 65/403 709/204 |

FOREIGN PATENT DOCUMENTS

| | | |
|---|---|---|
| KR | 1020010069909 A | 7/2001 |
| KR | 1020020016373 A | 3/2002 |
| KR | 1020040103680 A | 12/2004 |
| WO | 02/01405 A1 | 1/2002 |

OTHER PUBLICATIONS

Communication issued by the Korean Intellectual Property Office in counterpart Korean Patent Application No. 10-2007-0026064 on Nov. 20, 2013.

\* cited by examiner

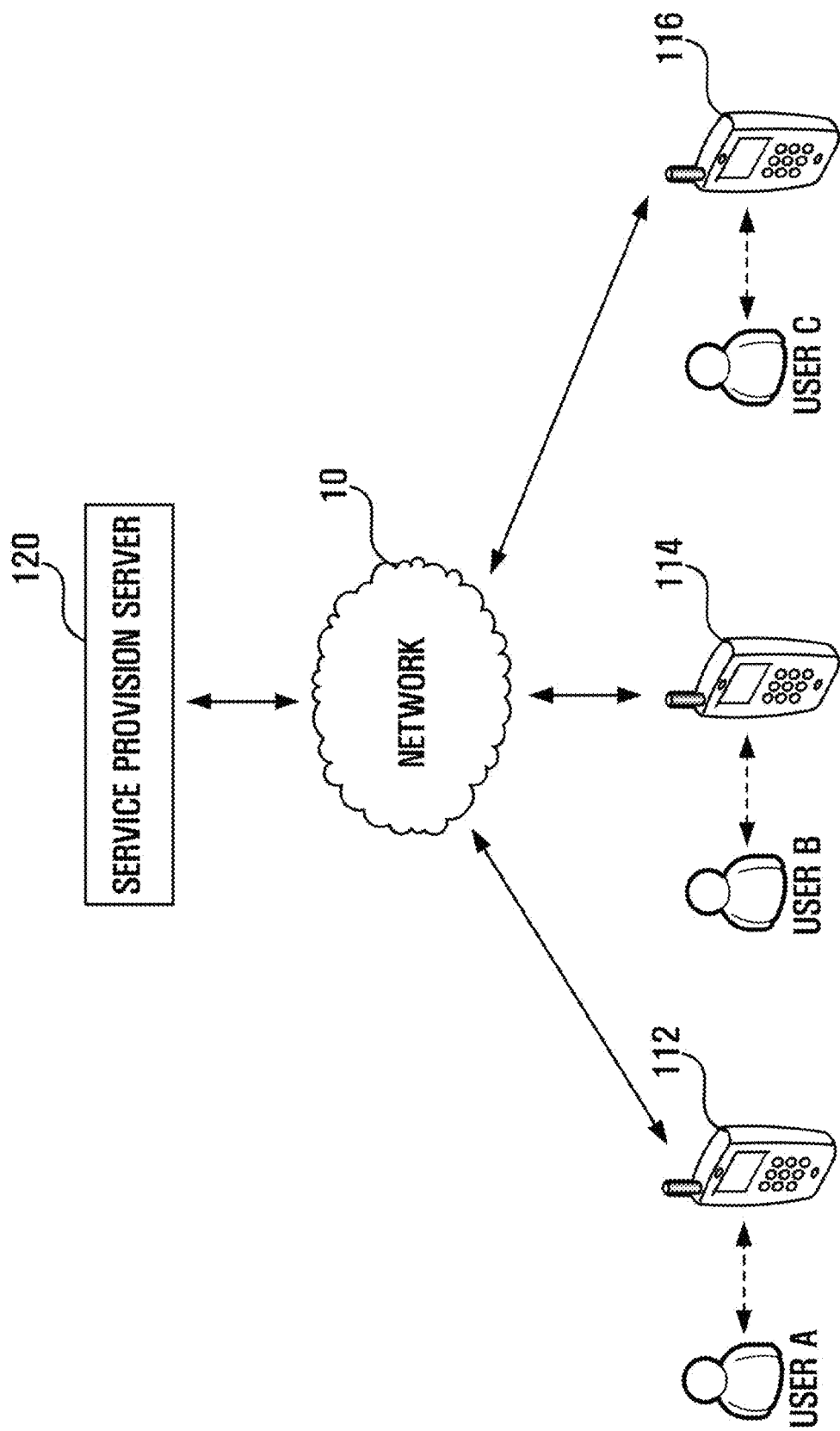

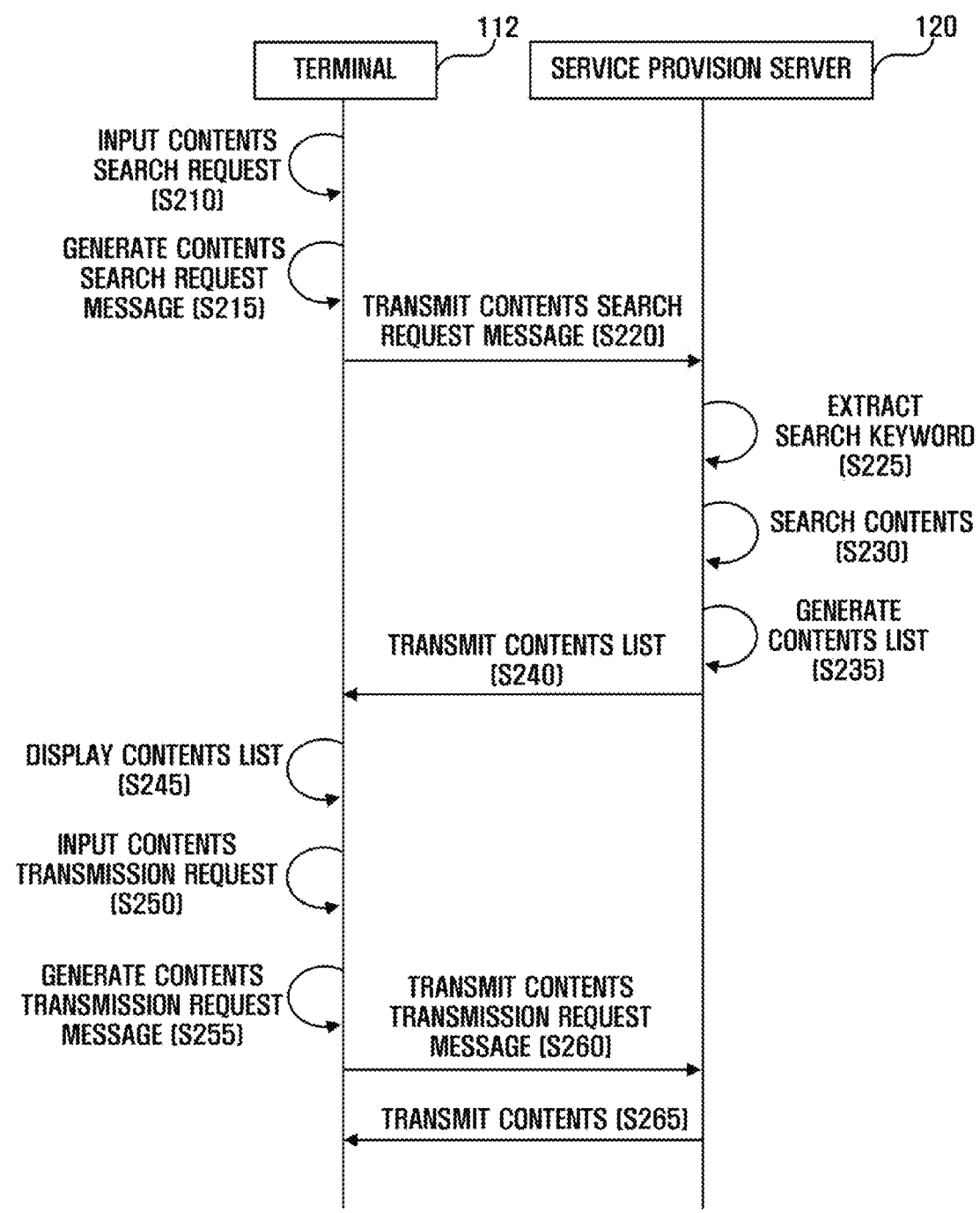

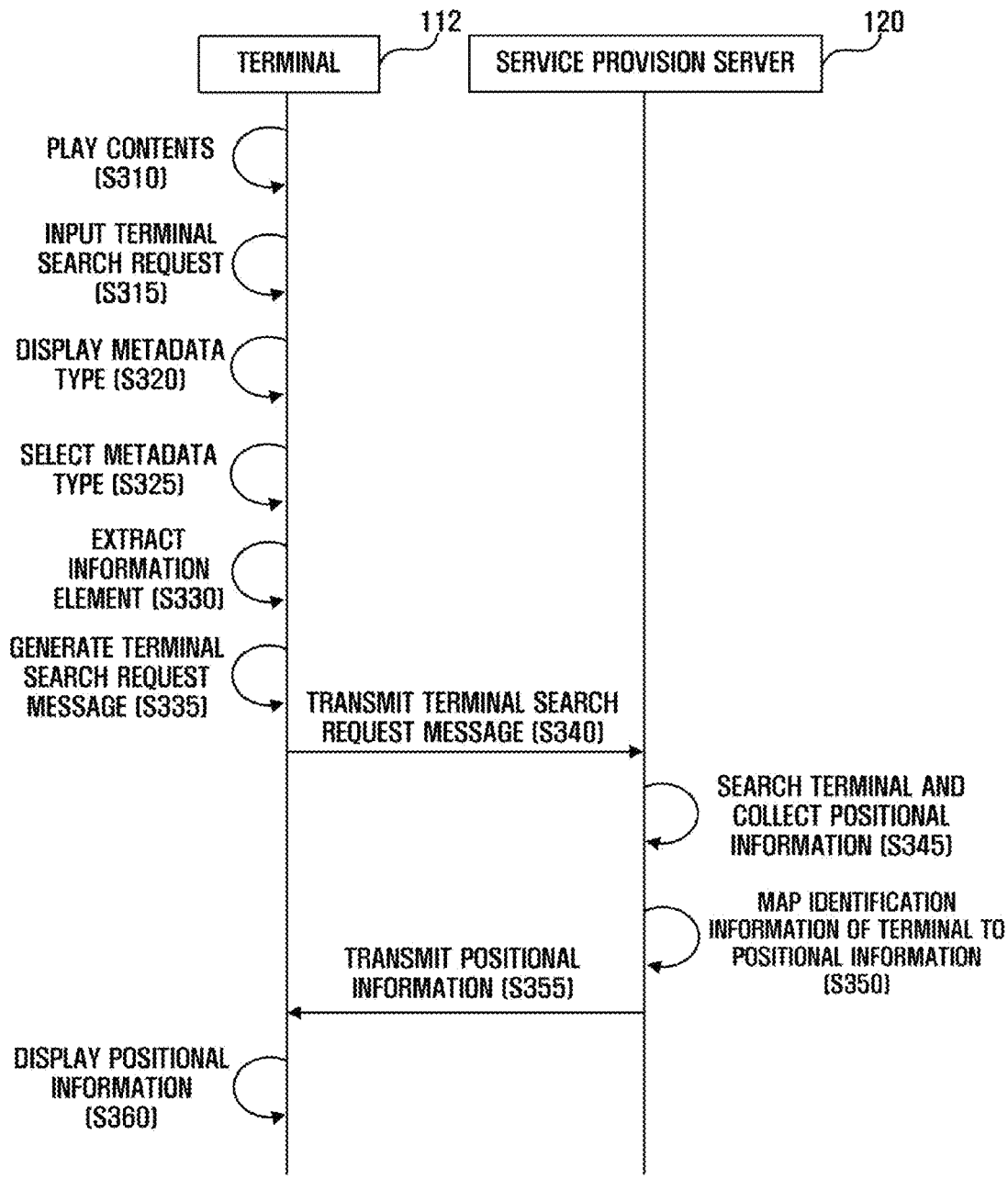

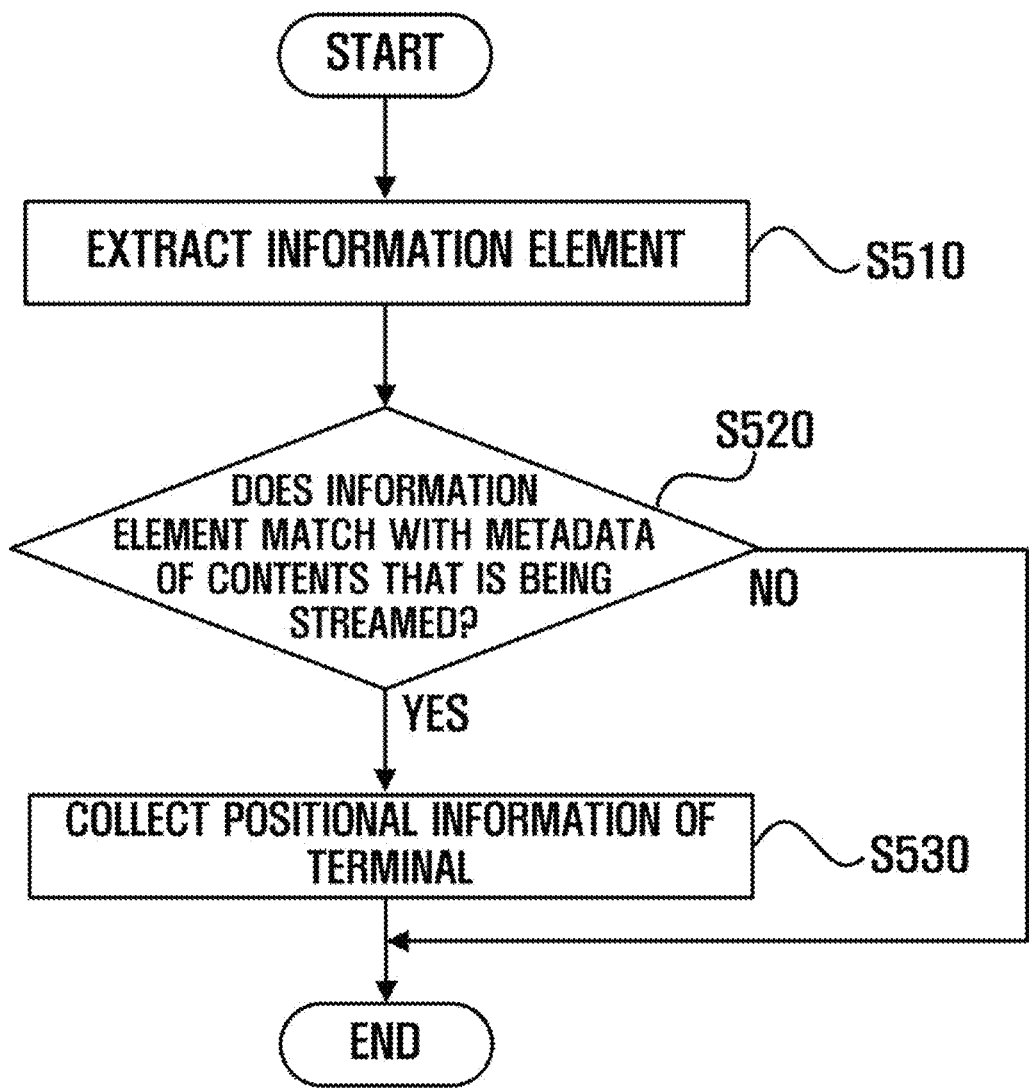

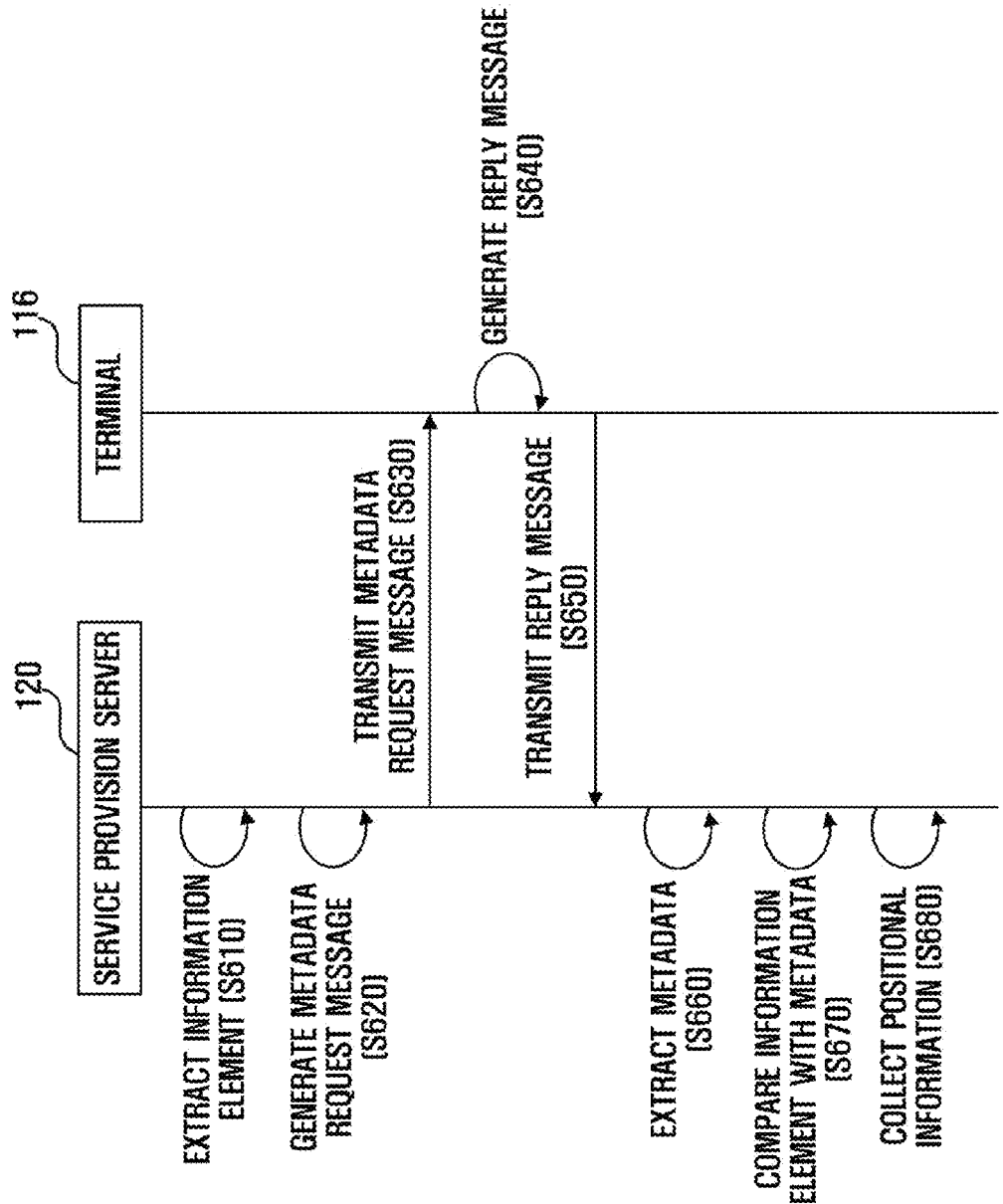

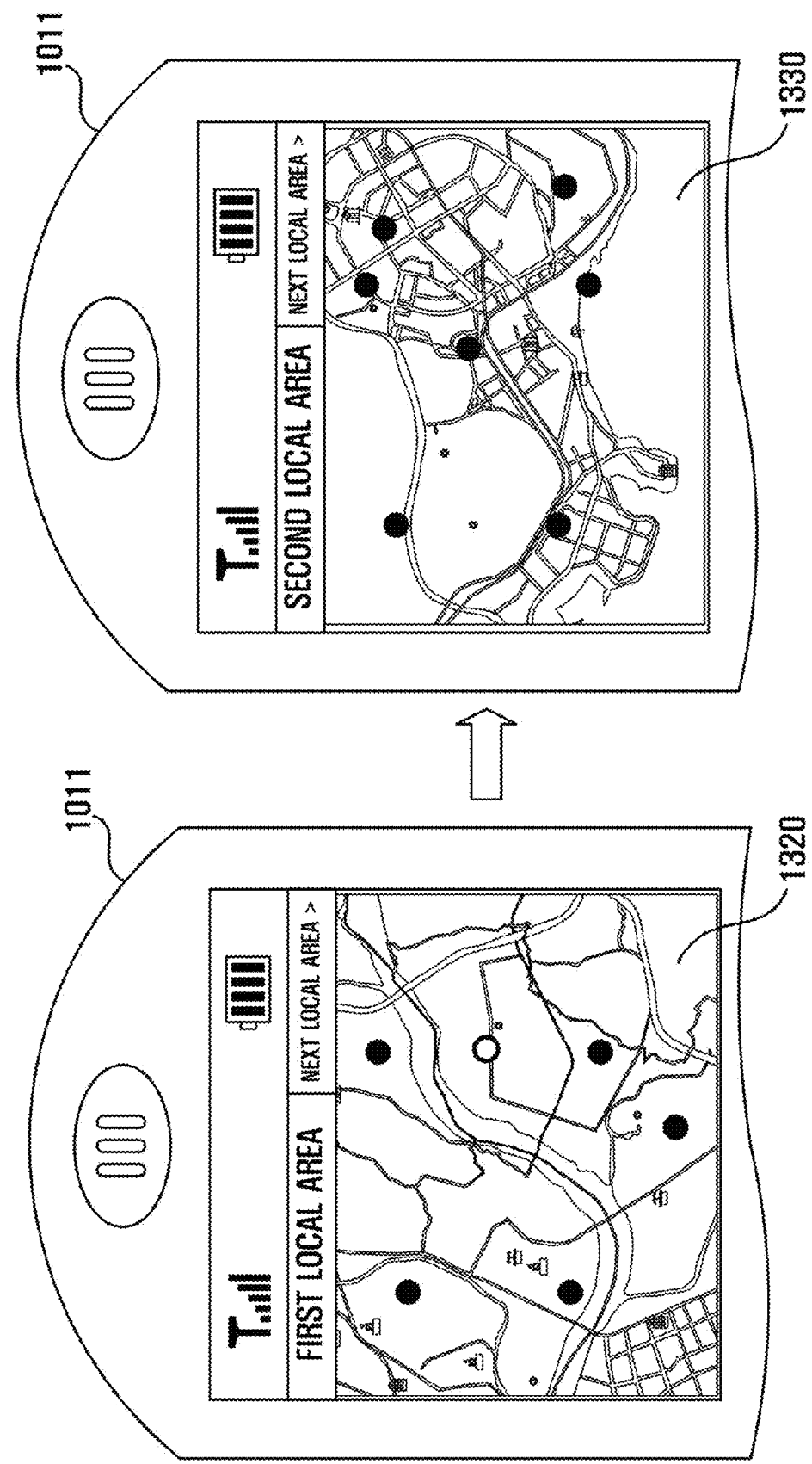

METHOD OF PROVIDING SERVICE FOR USER SEARCH, AND APPARATUS, SERVER, AND SYSTEM FOR THE SAME

CROSS REFERENCE TO RELATED APPLICATION

This is a continuation application of U.S. patent application Ser. No. 11/743,887 filed May 3, 2007, in the U.S. Patent and Trademark Office, which claims the benefit of U.S. Provisional Patent Application No. 60/796,870 filed on May 3, 2006, in the U.S. Patent and Trademark Office, which claims priority from Korean Patent Application No. 10-2007-0026064 filed on Mar. 16, 2007, in the Korean Intellectual Property Office, the disclosures of which are incorporated herein by reference in their entireties.

BACKGROUND OF THE INVENTION

1. Field of the Invention

Methods, apparatuses and systems consistent with the present invention relate to a service for user search, and in particular, to providing a service that searches users having similar taste in use of contents.

2. Description of the Related Art

With the development of digital technology, demands for various kinds of digital contents, such as music, movies, and games, are increasing. A user may make contact with people having similar tastes in order to search and use contents according to his/her taste and to exchange other kinds of information. For example, the user may join a club on a Web site so as to share various kinds and a large amount of information.

However, in the related art, in order for the user to obtain information related to the contents, which is being played, from another user, the user needs to upload an inquiry about the contents to the Web site or request to chat with other users, who are currently connected to the Web site, through IMs (Instant Messages). That is, in the related art, real-time information exchange is rarely performed.

In recent years, there are many users who store tens or hundreds of contents in a portable terminal, such as a cellular phone or a PMP (Portable Multimedia Player) and play desired contents without regard to time constraint or specific locations. The user who is using such a portable terminal rarely exchanges information with a user having similar taste in real time.

Accordingly, there is an unmet need for a technology that allows a user to exchange information related to contents, which the user is using, with other users having similar taste in real time.

SUMMARY OF THE INVENTION

The present invention provides a service that searches users, who use similar contents, in real time, and allows information exchange with the searched users.

According to an aspect of the present invention, there is provided a service provision method, the service provision method including transmitting a terminal search request message including a contents information component to a service provision server, receiving positional information of a terminal, which is playing first contents related to the contents information element, from the service provision server, and displaying the received positional information.

According to another aspect of the present invention, there is provided a service provision method, the service provision method including receiving a terminal search request message from a first terminal, collecting positional information of a second terminal, which is playing contents related to a contents information element included in the received terminal search request message, and transmitting the collected positional information to the first terminal.

According to still another aspect of the present invention, there is provided a digital device, the digital device including a control unit generating a terminal search request message including a contents information element, a network interface unit transmitting the generated terminal search request message to a service provision server and receiving positional information of a terminal, which is playing first contents related to the contents information element, from the service provision server, and a display unit displaying the received positional information.

According to yet still another aspect of the present invention, a service provision server, the service provision server including a positional information management device collecting positional information of a second terminal, which is playing contents related to a contents information element included in a terminal search request message, and a service processing device receiving the terminal search request message from a first terminal and transmitting the collected positional information to the first terminal.

According to yet still another aspect of the present invention, there is provided a service provision system, the service provision system including a first service provision server, when a terminal search request message is received from a first terminal, collecting positional information of a second terminal, which is playing contents related to a contents information element included in the terminal search request message in a first local area, and transmitting the contents information element to a relay server, a second service provision server collecting positional information of a third terminal, which is playing contents related to the contents information element in a second local area, and the relay server transmitting the contents information element transmitted from the first service provision server to the second service provision server and transmitting the positional information of the third terminal collected by the second service provision server to the first service provision server. The first service provision server transmits the positional information of the second terminal and the positional information of the third terminal to the first terminal.

BRIEF DESCRIPTION OF THE DRAWINGS

The above and other aspects and features of the present invention will become more apparent by describing in detail exemplary embodiments thereof with reference to the attached drawings in which:

FIG. 1 is a diagram showing a service system according to an exemplary embodiment of the present invention;

FIG. 2 is a flowchart showing a contents provision process according to an exemplary embodiment of the present invention;

FIG. 3 is a flowchart showing a service management process according to an exemplary embodiment of the present invention;

FIG. 5 is a flowchart showing a positional information collection process according to an exemplary embodiment of the present invention positional information;

FIG. 6 is a flowchart showing a positional information collection process according to another exemplary embodiment of the present invention;

FIG. 13B is a diagram showing a state where a terminal according to another exemplary embodiment of the present invention is displaying positional information;

DESCRIPTION OF THE EXEMPLARY EMBODIMENTS

Figure 4A:
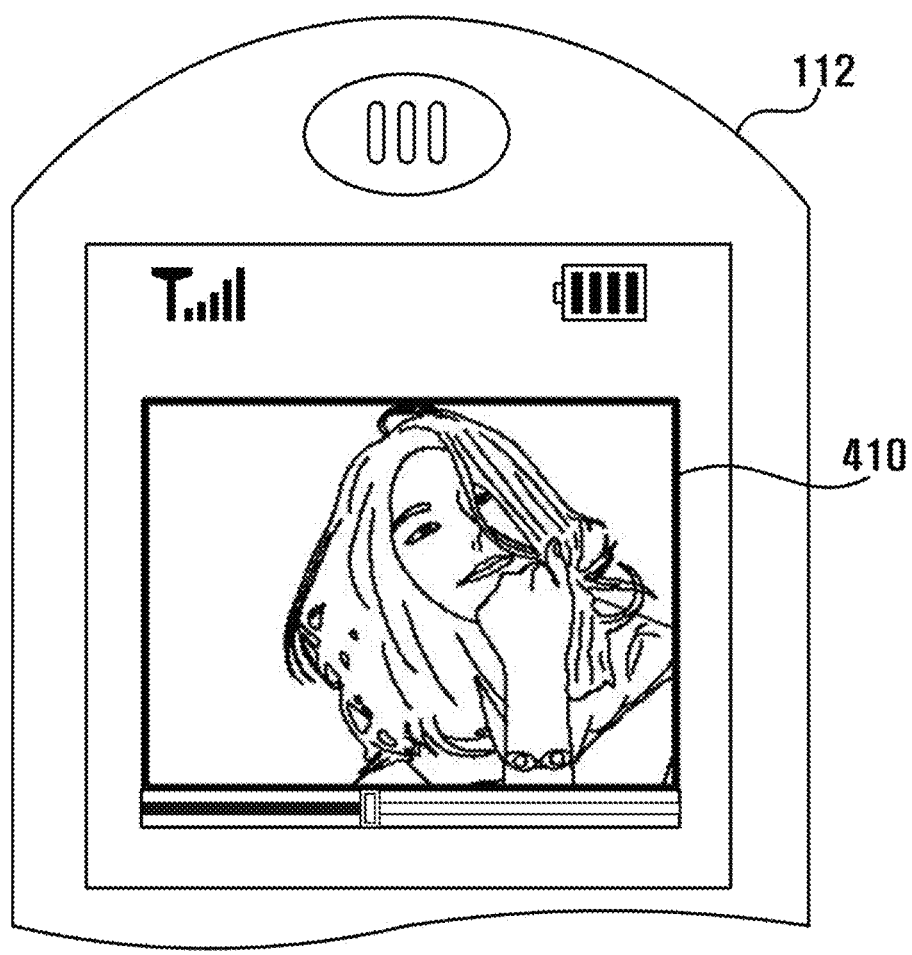
FIG. 4A is a diagram showing a state where a terminal is playing movie contents according to an exemplary embodiment of the present invention.

Aspects and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, exemplary embodiments of the present invention will be described with reference to the accompanying drawings.

FIG. 1 is a diagram showing a service system according to an exemplary embodiment of the present invention. In FIG. 1, three terminals 112, 114, and 116 are shown, but this is just an example, and other numbers of terminals as would be understood by those skilled in the art may be envisioned. Further, the individual terminals 112, 114, and 116 can be the same or have similar functions. Accordingly, a description for a specified terminal can be applied to other terminals. However, users of the individual terminals 112, 114, and 116 are different. Hereinafter, for convenience of explanation, the users of the individual terminals 112, 114, and 116 are referred to as "user A", "user B", and "user C", respectively.

In FIG. 1, a network 10 may be wired, wireless, or a combination thereof. The network 10 is a communication path between the terminal 112 and a service provision server 120. The network 10 may include a relay station (for example, a base station or an AP (Access Point)) that relays communication between the terminal 112 and the service provision server 120.

The terminal 112 can perform communication with the service provision server 120 through the network 10. In order to communicate with the service provision server 120, the terminal 112 can use a communication protocol based on, for example but not by way of limitation, Code Division Multiple Access (CDMA), Wideband Code Division Multiple Access (WCDMA), or Global System for Mobile communication (GSM). For example, the terminal 112 may use a communication protocol based on the IEEE 802.11 standard or the IEEE 802.15.3 standard or other types of protocols.

The terminal 112 can play contents that includes a digital object including at least one of video information, audio information, and text information. Specific examples of the contents include movies, music, photographs, Java games, electronic books, and various digital broadcasting (Digital Multimedia Broadcasting (DMB), Digital Video Broadcasting (DVB), and Digital Audio Broadcasting (DAB)). According to an exemplary embodiment of the present invention, the terminal 112 can operate one of a streaming mode and a general mode to play the contents.

In the streaming mode, the terminal 112 can receive the contents from the service provision server 120 in a streaming method. In this case, the terminal 112 can play the contents while buffering by an amount. In the general mode, the terminal 112 can play contents stored therein or contents stored in a storage medium connected thereto. The contents stored in the terminal 112 or the contents stored in the storage medium connected to the terminal 112 may be downloaded from the service provision server 120 or acquired through a different path.

The terminal 112 may be a portable digital device, such as a cellular phone, a Personal Digital Assistant (PDA), or a notebook computer, but is not limited thereto. Alternatively, the terminal 112 may be a fixed digital device, such as a set-top box, a desktop computer, or a digital TV.

The service provision server 120 can provide contents and metadata of the contents to the terminal 112. The metadata includes one or more contents information elements representing the features of the contents. The kinds of contents information elements can vary according to the types of contents. For example, if the type of contents is music, the metadata of the contents can include contents information elements, such as genre, artist, album, and melody. If the type of contents is a movie, the metadata can include contents information elements, such as genre, leading actor, and director. If the type of contents is digital broadcasting, the metadata can include contents information elements, such as channel and program.

The metadata can be constructed as a separate data object from the contents. However, the metadata may also be included in the contents, such that the metadata and the contents are constructed as a single data object.

Meanwhile, the service provision server 120 can search a terminal, which is playing contents related to a specified contents information element, among other terminals 114 and 116 according to the request of the terminal 112 and can provide positional information of the searched terminal to the terminal 112.

To receive a service from the service provision server 120, the terminal 112 needs to be connected to the service provision server 120. The connection of the terminal 112 to the service provision server 120 can mean that a communication channel is established therebetween to allow the terminal 112 to transmit a message to request a service to the service provision server 120 and allow the service provision server 120 to provide a service according to the request of the terminal 112.

The service provision server 120 may perform an authentication processing to permit or reject the connection of the terminal 112. To this end, the service provision server 120 can compare authentication information to be transmitted from the terminal 112 with previous registration information. For example, the user A can register his/her ID and password in the service provision server 120 using the terminal 112 in advance. Thereafter, the terminal 112 that is to be connected to the service provision server 120 according to the request of the user A transmits the ID and password of the user A to the service provision server 120, and the service provision server 120 compares the ID and password of the user A received from the terminal 112 with the previously registered ID and password, so as to decide whether to permit the connection of the terminal 112. This authentication system can be understood in the similar manner to a log-in system or a sign-in system. As an example, the service provision server 120 may perform the authentication processing based on a different authentication system.

Hereinafter, a service provision process according to an exemplary embodiment of the present invention will be described in detail. In the following embodiments, it is assumed that the terminals 112, 114, and 116 are connected to the service provision server 120 (for example, the service provision server 120 has permitted the connection of the terminals 112, 114, and 116).

FIG. 2 is a flowchart showing a contents provision process according to an exemplary embodiment of the present invention.

The user A who wants to receive contents from the service provision server 120 inputs a contents search request to the terminal 112 together with a keyword to be used to search contents (hereinafter, referred to as "search keyword"). If the contents search request is input from the user A (Operation S210), the terminal 112 generates contents search request message including the input keyword (Operation S215) and transmits the generated contents search request message to the service provision server 120 (Operation S220). The contents search request message may include a plurality of search keywords, but is not limited thereto.

The service provision server 120 extracts the search keyword from the contents search request message received from the terminal 112 (Operation S225) and searches contents related to the extracted search keyword (Operation S230). For example, if the search keyword is the name of a singer, the service provision server 120 can search music contents of the corresponding singer. If a plurality of search keywords are extracted from the contents search request message, the service provision server 120 can search contents related to the plurality of search keywords.

If the search processing at Operation S230 is completed, the service provision server 120 generates a list of contents, which are found as the search result (Operation S235), and transmits the generated contents list to the terminal 112 (Operation S240). The contents list can include information regarding contents, such as the title, type, and identifier of the contents.

The terminal 112 that receives the contents list from the service provision server 120 displays the contents list (Operation S245). At this time, the user A can select a desired item from the contents list using the terminal 112 and request transmission of contents corresponding to the selected item. Further, the user A can determine one of a streaming method and a download method as a contents transmission method using the terminal 112.

If a contents transmission request is input from the user A (Operation S250), the terminal 112 generates a contents transmission request message including an identifier of the contents (Operation S255) and transmits the generated contents transmission request message to the service provision server 120 (Operation S260). The contents transmission request message that is generated at Operation S255 can also include information regarding the contents transmission method determined by the user A.

The service provision server 120 extracts the contents identifier from the contents transmission request message transmitted from the terminal 112 and transmits contents to be identified by the extracted contents identifier to the terminal 112 (Operation S265). At Operation S265, the metadata of the contents can also be transmitted to the terminal 112. As described above, the metadata may be included in the contents or may be transmitted to the terminal 112 as a separate data object from the contents.

At Operation S265, the content transmission method from the service provision server 120 to the terminal 112 may be either the streaming method or the download method. What contents transmission method is to be used may be set in the service provision server 120 in advance. As described above, if the contents transmission request message transmitted from the terminal 112 includes the information regarding the contents transmission method, the contents transmission method may be determined at Operation S265 accordingly.

When the contents transmission method is the streaming method, a play mode of the terminal 112 becomes a streaming mode.

FIG. 3 is a flowchart showing a service management process according to an exemplary embodiment of the present invention. In this exemplary embodiment, a case where the terminal 112 searches other terminals 114 and 116 will be described. This can be understood that, the "user A" as the user of the terminal 112 searches the "user B" and the "user C" as the users of other terminals 114 and 116.

First, according to a request of the user A, the terminal 112 plays contents (Operation S310). The play mode of the terminal 112 may be the streaming mode or the general mode.

Figure 4B:
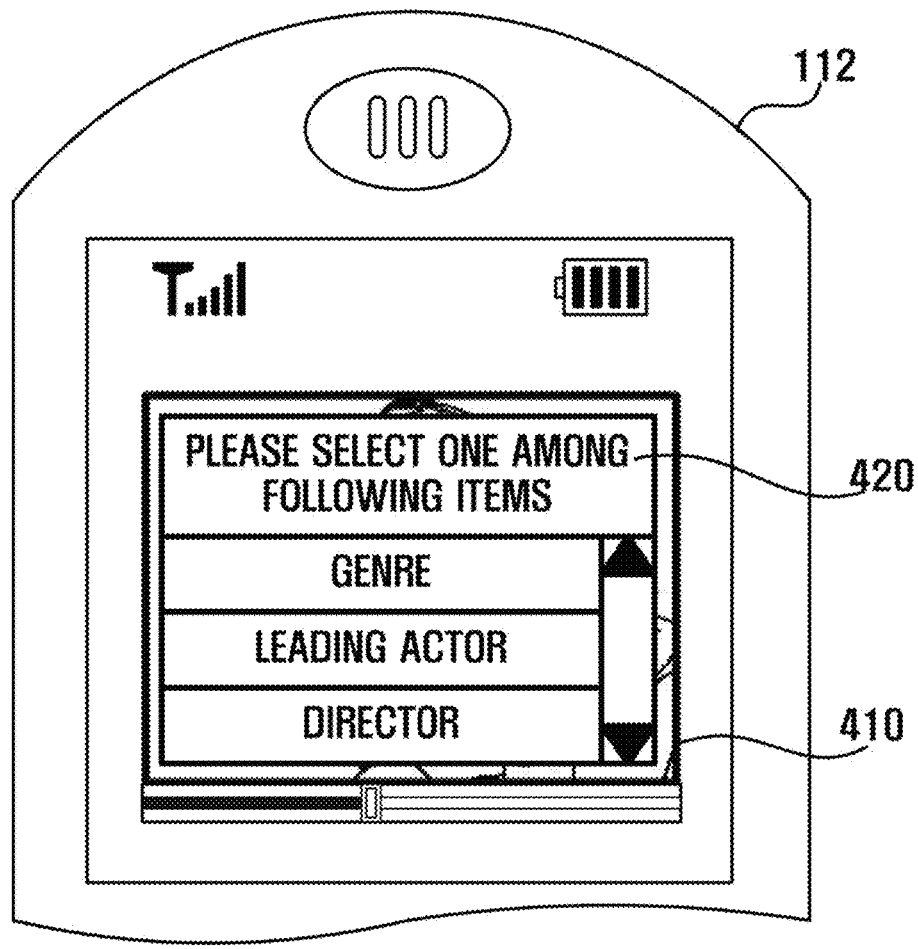
FIG. 4B is a diagram showing a metadata type selection screen according to an exemplary embodiment of the present invention.

If a terminal search request is input from the user A while the contents is being played (Operation S315), the terminal 112 displays the type of metadata related to the type of the contents that is being played (Operation S320). For example, as shown in FIG. 4A, if a terminal search request is input from the user A while the terminal 112 is playing movie contents 410, the terminal 112 can display a metadata type selection screen 420 that shows the type of metadata ("genre", "leading actor", or "director") related to the movie contents, as shown in FIG. 4B.

When the terminal search request is input, the terminal 112 can temporarily stop playing of the contents, or can continue playing the contents.

The user A can select one or more types of metadata as a search reference among the types of metadata displayed by the terminal 112.

If the user A selects the type of metadata (Operation S325), the terminal 112 extracts a contents information element corresponding to the type of metadata selected by the user A from metadata of the contents that is being played (Operation S330). For example, if the terminal 112 is playing movie contents of "The Lord of the Rings" and the user selects "director" among the types of metadata, at Operation S330, the terminal 112 can extract "Peter Jackson" as a contents information element corresponding to the type "director" from metadata of the movie contents ("The Lord of the Rings") that is being played.

Thereafter, the terminal 112 generates a terminal search request message including the extracted contents information element (Operation S335) and transmits the generated terminal search request message to the service provision server 120 (Operation S340).

The service provision server 120 that receives the terminal search request message from the terminal 112 searches a terminal, which is playing contents related to the contents information element included in the terminal search request message, from other terminals 114 and 116 connected thereto and collects positional information of the searched terminal (Operation S345).

Operation S345, at which a terminal is searched and positional information is collected, may vary according to whether the terminals 114 and 116 are receiving contents in the streaming method. More specifically, the service provision server 120 can judge whether or not the terminals 114 and 116 connected thereto are receiving contents in the streaming method and can perform a process of FIG. 5 or a process of FIG. 6 according to the judgment result. Since Operation S345 can be performed on all of the terminals connected to the service provision server 120, the service provision server 120 can perform the process of FIG. 5 and the process of FIG. 6 sequentially or in parallel according to the play mode of each of the terminals connected thereto. For convenience of explanation, it is assumed that the terminal 114 is receiving contents from the service provision server 120 in the streaming method, whereas the terminal 116 is not receiving contents in the streaming method. In this case, the terminal 114 may be playing contents in the streaming mode, while the terminal 116 may not be playing contents or may be playing contents in the general mode.

FIG. 5 is a flowchart showing a positional information collection process according to an exemplary embodiment. This process is performed on the terminal 114 that is receiving contents in the streaming method.

The service provision server 120 extracts a contents information element from the terminal search request message received at Operation S340 of FIG. 3 (Operation S510). Next, the service provision server 120 judges whether the metadata of the contents that is being received by the terminal 114 in the streaming method matches with the contents information element extracted at Operation S510 (Operation S520).

As the judgment result at Operation S520, if the contents information element extracted from the terminal search request message matches with the metadata of the contents that is being transmitting to the terminal 114 (more specifically, if the metadata includes the same contents information element), the service provision server 120 collects positional information of the terminal 114 (Operation S530).

However, as the judgment result at Operation S520, if the metadata of the contents that is being transmitted to the terminal 114 does not include the contents information element extracted at Operation S510, the positional information of the terminal 114 is not collected.

The process of FIG. 5 can be performed on all of the terminals that are receiving contents from the service provision server 120 in the streaming method when the terminal search request message is received from the terminal 112.

Meanwhile, the service provision server 120 can perform the process of FIG. 6 on the terminal 116, which is not receiving contents in the streaming method, among the terminals connected to the service provision server 120.

If the terminal search request message is received from the terminal 112 (Operation S340 of FIG. 3), the service provision server 120 extracts the contents information element from the terminal search request message (Operation S610). Thereafter, the service provision server 120 generates a metadata request message (Operation S620) and transmits the generated metadata request message to the terminal 116 (Operation S630).

If the terminal 116 receives the metadata request message while playing contents, the terminal 116 generates a reply message including metadata of the contents that is being played (Operation S640) and transmits the generated reply message to the service provision server 120 (Operation S650).

If the reply message is received from the terminal 116, the service provision server 120 extracts the metadata from the reply message (Operation S660) and compares the extracted metadata with the contents information element extracted at Operation S610 (Operation S670).

As the comparison result at Operation S670, if the contents information element extracted at Operation S610 is included in the metadata extracted at Operation S660, the service provision server 120 collects positional information of the terminal 116 (Operation S680). However, as the comparison result at Operation S670, if the contents information element extracted at Operation S610 is not included in the metadata extracted at Operation S660, the positional information of the terminal 116 is not collected.

Though not shown in FIG. 6, if the terminal 116 receives the metadata request message while not playing contents, Operation S640 can be substituted with an operation of generating a reply message including information that the terminal 116 is not playing contents. In this case, since the metadata is not included in the reply message, Operations S660 to S680 of FIG. 6 cannot be performed.

Meanwhile, Operation S630 of FIG. 6 can be automatically performed without needing the involvement of the user C. For example, the user C may set the terminal 116 whether or not to reply to the metadata request message of the service provision server 120. If the terminal 116 is set to reply the metadata request message, Operation S630 of FIG. 6 can be automatically performed. If the terminal 116 is set not to reply to the metadata request message, Operation S630 of FIG. 6 can be substituted with an operation of generating a reply message including information that the metadata cannot be noticed.

Operation S630 can be performed with the involvement of the user C in real time. For example, if the metadata request message is received from the service provision server 120, the terminal 116 can display the content of a request to decide whether to reply to the metadata request message. At this time, the user C can decide whether to reply to the request of the service provision server 120. If the user C decides to reply to the metadata request message, the terminal 116 can perform Operation S630. However, if the user C decides not to reply to the metadata request message, Operation S630 of FIG. 6 can be substituted with an operation of generating a reply message including information indicating that the metadata cannot be noticed. The involvement of the user C can be previously set in the terminal 116 by the user C.

The process of FIG. 6 can be performed on all of the terminals, which are connected to the service provision server 120 but are not receiving contents in the streaming method when the terminal search request message is received from the terminal 112.

Returning to FIG. 3, the service provision server 120 can map the collected positional information to identification information of the terminal (for example, the identifier of the terminal and the ID of a user of the terminal) (Operation S350). Thereafter, the service provision server 120 transmits the collected positional information to the terminal 112 (Operation S355). At this time, the identification information of the terminal mapped to the positional information at Operation S350 can also be transmitted to the terminal 112. Accordingly, the terminal 112 can notice the identification information of the terminal corresponding to the positional information.

The terminal 112 that receives the positional information from the service provision server 120 displays the received positional information (Operation S360). At Operation S360, the terminal 112 can display positional information as a list or a table in a text format. However, the terminal 112 may display the positional information as a map. For example, at Operation S355, the service provision server 120 can transmit an electronic map including the positional information to the terminal 112. Further, the terminal 112 may receive an electronic map from the service provision server 120 in advance and display the positional information transmitted at Operation S355 together with a previously acquired electronic map. The terminal 112 may acquire an electronic map through a different path in advance.

The positional information can include coordinate information based on the electronic map. The positional information may include information regarding latitude and longitude and convert the positional information according to a coordinate system suitable for an electronic map provided in the terminal 112.

Figure 7:
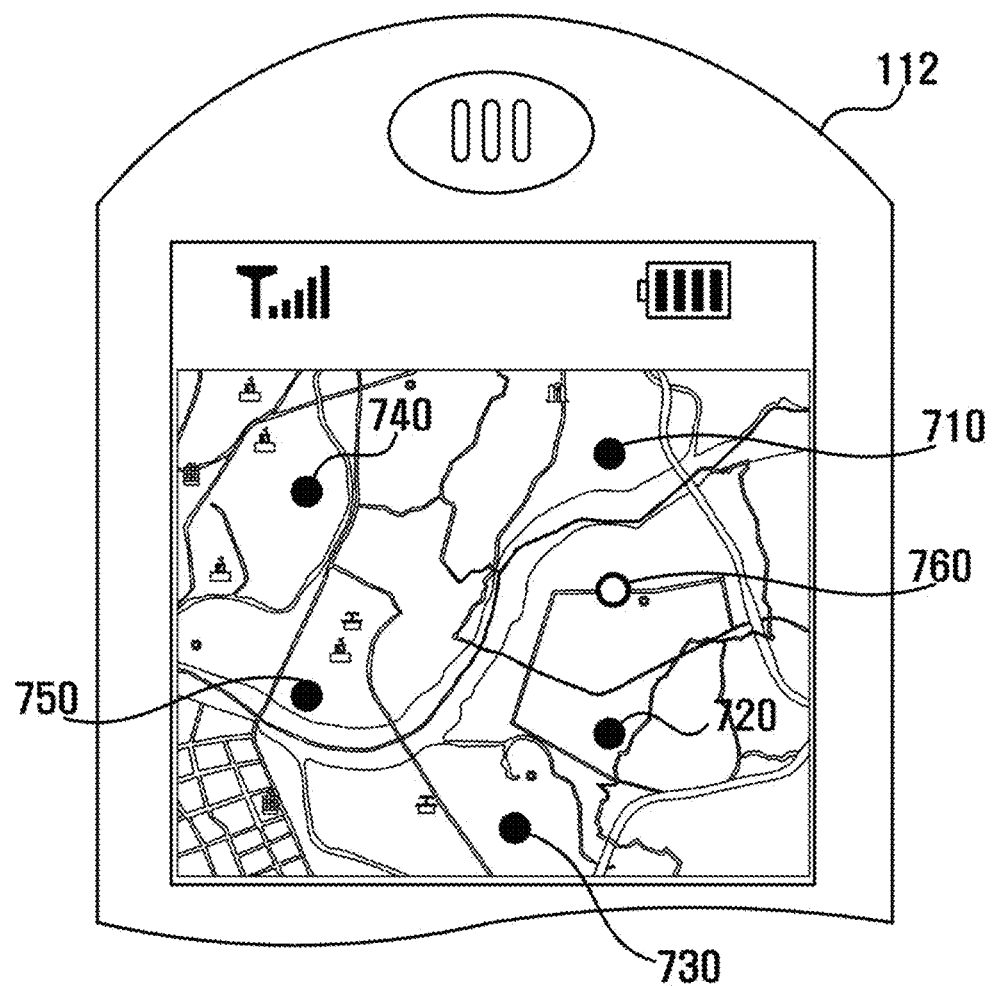
FIG. 7 is a diagram showing a state where a terminal according to an exemplary embodiment of the present invention is displaying positional information.

An example of the positional information that is displayed by the terminal 112 at Operation S360 is shown in FIG. 7. In FIG. 7, hatched circles 710 to 750 are spots that are indicated by the positional information from the service provision server 120. These spots represent the positions of other terminals (for example, the terminal 114 and the terminal 116), which are playing contents related to the metadata of the contents that the terminal 112 is playing. That is, the positional information can represent the positions of other users (for example, the user B and the user C) having similar taste to the user A. Accordingly, the user A can determine the presence/absence of other users having similar taste and the positions of them. A map shown in FIG. 7 includes information 760 representing the position of the terminal 112, that is, the position of the user A. At Operation S360, the positional information of the terminal 112 can be provided from the service provision server 120 together with the positional information of other terminals. When the terminal 112 has a function of managing its own positional information (for example, a GPS function), the terminal 112 itself may provide its own positional information.

If the number of searched terminals is large, it is inefficient for the terminal 112 to display all positional information of the terminals. Accordingly, according to an exemplary embodiment, the number of positional information to be provided from the service provision server 120 may be limited to the critical number of positional information. That is, when the number of positional information collected by the service provision server 120 exceeds the critical number of positional information, the service provision server 120 can select only positional information that is as much as the critical number of positional information and provide the selected positional information to the terminal 112. Here, the critical number of positional information may be previously set by an operator of the service provision server 120 or may be directly set through the terminal 112 when the user A inputs the terminal search request. If the user A directly sets the critical number of positional information, the set critical number of positional information can be included in the terminal search request message generated at Operation S335 of FIG. 3. Then, the service provision server 120 that receives the terminal search request message can provide positional information according to the critical number of positional information. Moreover, the method that the service provision server 120 selects the critical number of positional information among a plurality of positional information is not intended to limit the present invention. The service provision server 120 may randomly select positional information among a plurality of positional information or may select the required number of positional information in proportion to a distribution density of positional information according to sub-areas of an area to be handled by the service provision server 120.

The user A can select positional information to be displayed by the terminal 112 and perform communication with a user of a terminal corresponding to the selected positional information. This will be described with reference to FIG. 8.

If one of the positional information to be displayed through the process of FIG. 3 is selected by the user A (Operation S810), the terminal 112 generates a communication request message to request communication with a terminal corresponding to the selected positional information (Operation S815) and transmits the generated communication request message to the service provision server 120 (Operation S820). The communication request message can include at least one of the positional information selected at Operation S810 and the identification information regarding the terminal corresponding to the selected positional information. Information included in the communication request message allows the service provision server 120 to notice which terminal the terminal 112 wants to communicate with. Accordingly, any information that corresponds to this end may be included in the communication request message. Further, the communication request message may also include the identification information of the terminal 112 (for example, the identifier of the terminal 112 or the ID of the user A).

The service provision server 120 judges, on the basis of the communication request message received from the terminal 112, which terminal the terminal 112 wants to communicate with (Operation S825). As the judgment result at Operation S825, it is assumed that the terminal 114 is confirmed as a communication party of the terminal 112.

The service provision server 120 generates an acceptance/rejection confirmation message including the identification information of the terminal 112 (Operation S830) and transmits the generated acceptance/rejection confirmation message to the terminal 114 (Operation S835).

If the acceptance/rejection confirmation message is received from the service provision server 120, the terminal 114 displays information indicating that the terminal 112 requests communication (Operation S840). At Operation S840, the identification information of the terminal 112 that requests the communication may also be displayed.

The user B can confirm information displayed by the terminal 114 and determine whether to accept the communication request of the terminal 112. If the information that the communication request of the terminal 112 is accepted is input from the user B (Operation S845), the terminal 114 generates a communication acceptance message (Operation S850) and transmits the generated communication acceptance message to the service provision server 120 (Operation S855).

At this time, the service provision server 120 generates a reply message including information that the communication with the terminal 114 can be performed (Operation S860) and transmits the generated reply message to the terminal 112 (Operation S865).

Thereafter, the service provision server 120 relays communication between the terminal 112 and the terminal 114 (Operation S870).

Figure 9:
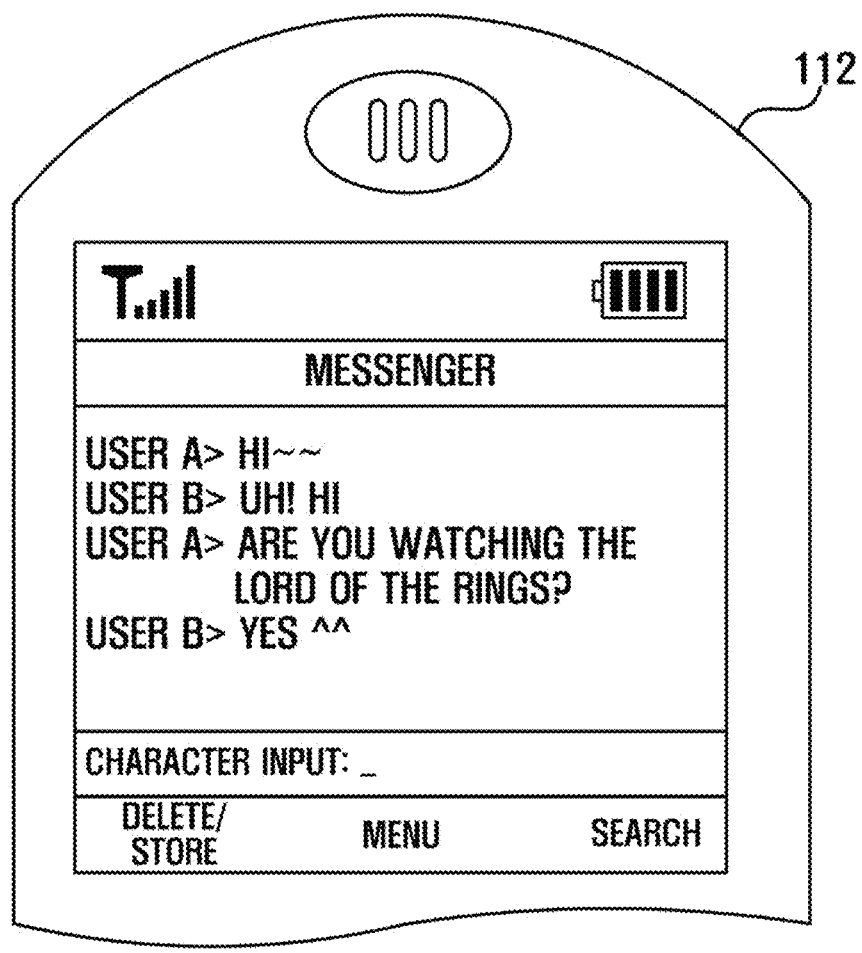
FIG. 9 is a diagram showing an IM service use screen according to an exemplary embodiment of the present invention.

Accordingly, a communication service can be provided between the terminal 112 and the terminal 114. That is, the user A can use the communication service with the user B having similar taste. Examples of the communication service include an Instant Messenger (IM) service, an Short Message Service (SMS), a voice call, and an image call. However, the communication service is not limited thereto. FIG. 9 shows an example of a screen that is displayed by the terminal 112 when the terminal 112 uses an IM service with the terminal 114.

Figure 8:
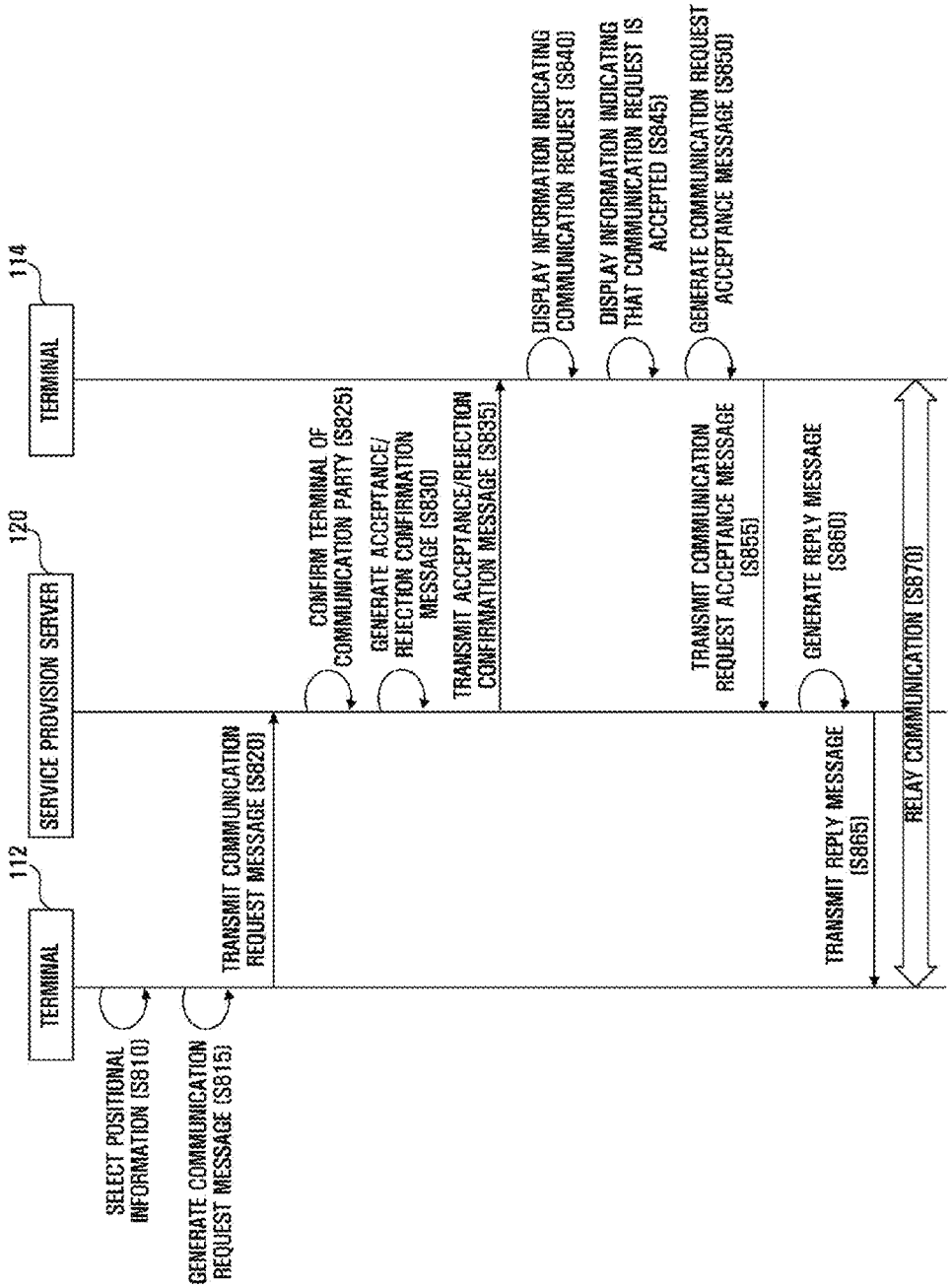
FIG. 8 is a flowchart showing a communication service use process between terminals according to an exemplary embodiment of the present invention.

Though not shown in FIG. 8, if information that the user B rejects communication is input at Operation S845, the terminal 114 can generate a communication rejection message and then transmit the generated communication rejection message to the service provision server 120. At this time, the service provision server 120 can generate a reply message including information that the communication is rejected and transmit the generated reply message to the terminal 112. In this case, the communication service is not provided between the terminal 112 and the terminal 114.

According to the request of the user A, the terminal 112 can store the positional information of the terminal 114 that has performed the communication with the terminal 112. Then, if the user A requests afterwards, the terminal 112 can display the stored positional information again. Accordingly, the user A can find the user B having similar taste in the use of contents on a map. As time elapses, the actual position of the user B may not be consistent with the positional information displayed by the terminal 112 again. However, since the radius of action of people is generally limited, it is not difficult for the user A to confirm the position of the user B on the map. Further, since the identification information of the terminal 114 that is mapped to the positional information may also be stored together with the positional information, the terminal 112 can reuse the communication service with the terminal 114. According to the exemplary embodiments, when the terminal 112 reuses the communication service with the terminal 114, the service provision server 120 may provide new positional information of the terminal 114 to the terminal 112. In this case, the terminal 112 can store the new positional information of the terminal 114. This can be similarly applied to the terminal 114 that has performed the communication with the terminal 112.

In FIGS. 1 to 9, the service system that has a single service provision server 120 has been described. However, a physical area that the single service provision server 120 can provide a service to the terminals may be limited. Accordingly, a service provision server may be provided for each area and a relay server that can connect the individual service provision servers to each other may be provided, such that a service provision area can be expanded. This will be described with reference to FIG. 10.

Figure 10:
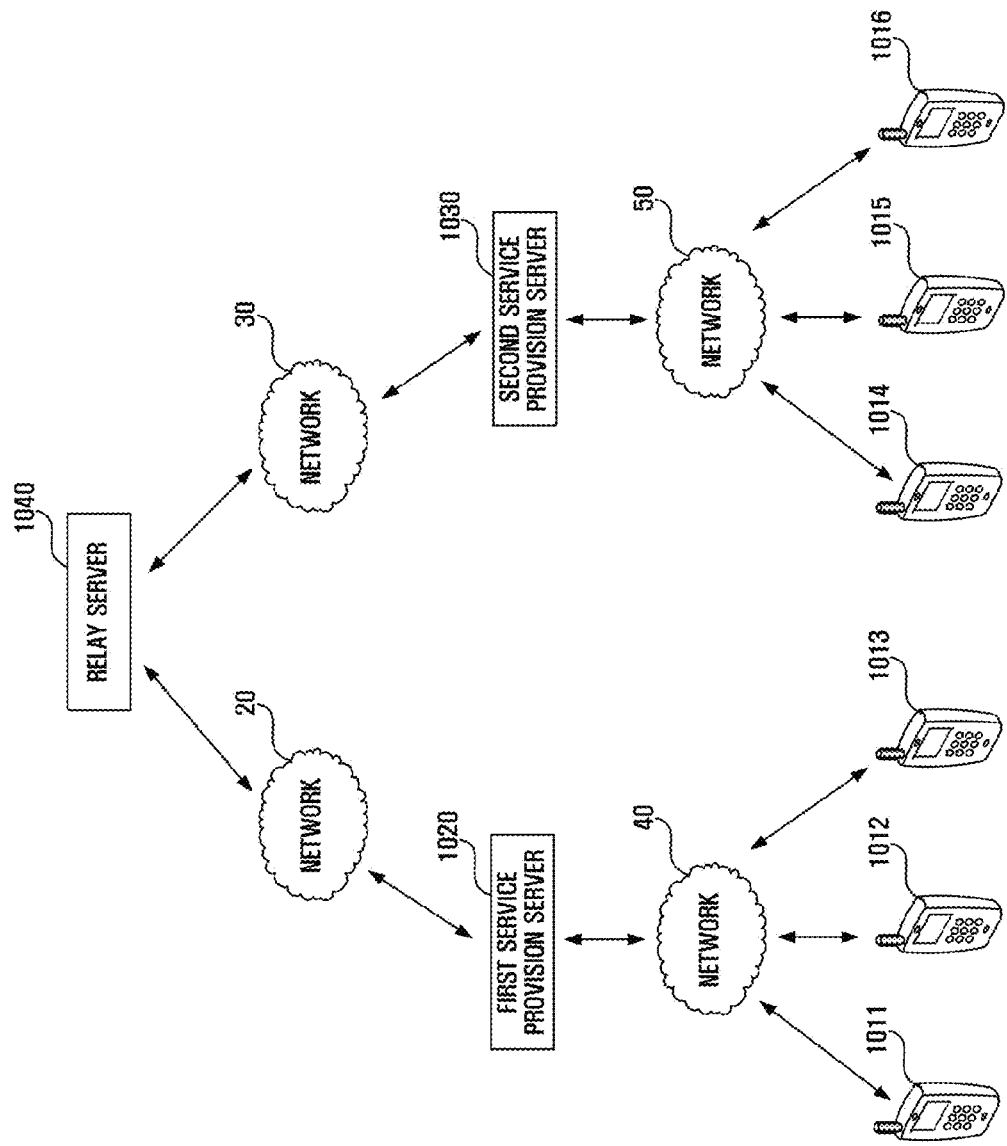
FIG. 10 is a diagram showing a service system according to an exemplary embodiment of the present invention.

FIG. 10 is a diagram showing a service system according to an exemplary embodiment. FIG. 10 shows a service system that has two service provision servers 1020 and 1030 and a relay server 1040, which connects the service provision servers 1020 and 1030 to each other. Alternatively, three or more service provision servers may be provided. The service provision servers 1020 and 1030 handle a first local area and a second local area, respectively. It should be understood that networks 20, 30, 40, and 50 shown in FIG. 10 are the same as the network 10 shown in FIG. 1.

Terminals 1011, 1012, and 1013 in the first local area can be connected to the first service provision server 1020 to receive a service, and terminals 1014, 1015, and 1016 in the second local area can be connected to the second service provision server 1030 to receive a service. This construction is a service environment that provides a service between cities, localities, and countries. It should be understood that the construction of the first local area or the second local area is the same as the service system shown in FIG. 1. In this exemplary embodiment, the service area is not limited to the same local area but can be expanded to another local area. This will be described in detail with reference to FIG. 11.

Figure 11:
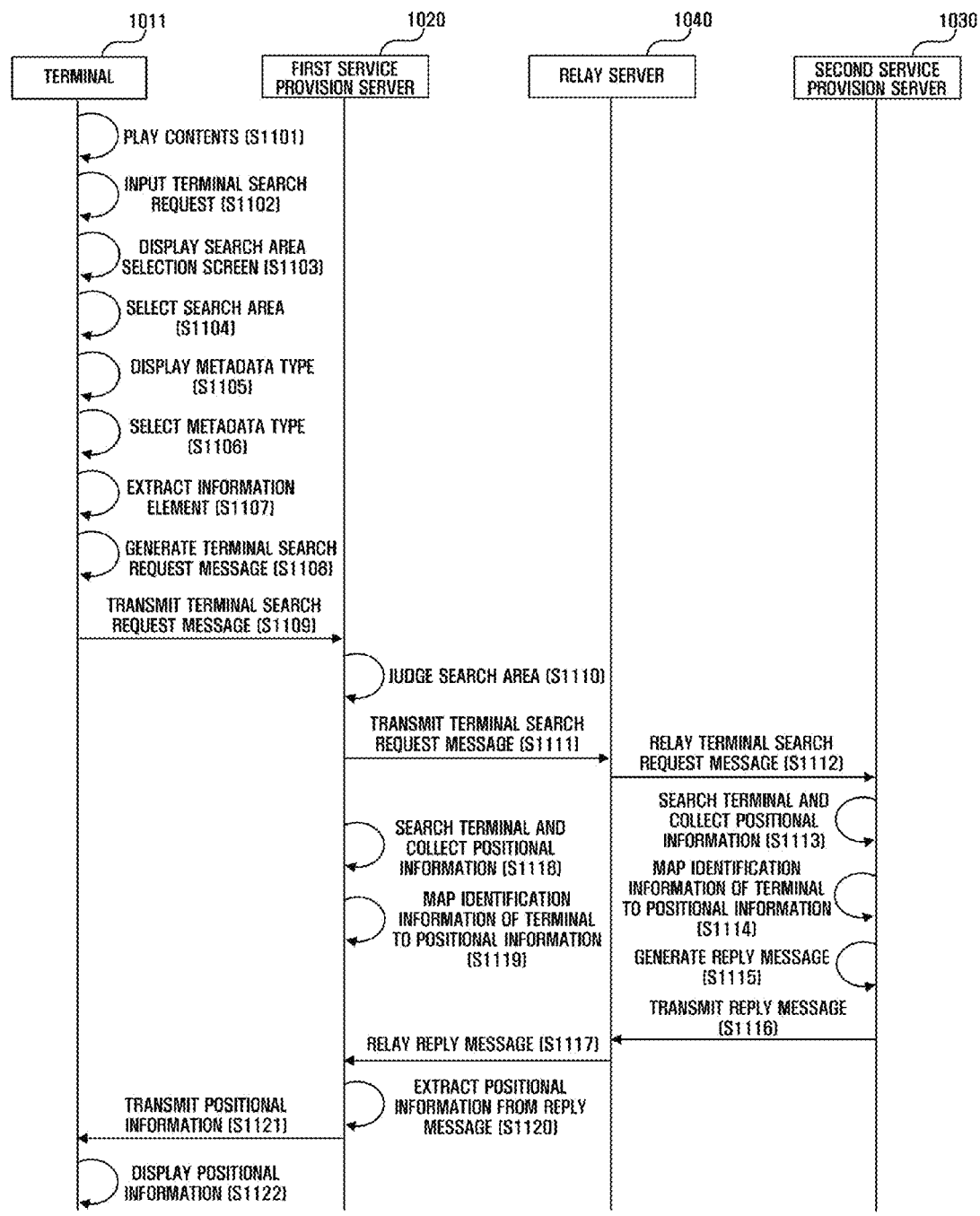
FIG. 11 is a flowchart showing a service provision process according to an exemplary embodiment of the present invention.

FIG. 11 is a flowchart showing a service provision process according to an exemplary embodiment, which will be described with respect to the terminal 1011.

According to the user's request, the terminal 1011 can play contents (Operation S1101). The play mode of the terminal 1011 may be the streaming mode or the general mode.

Figure 12A:
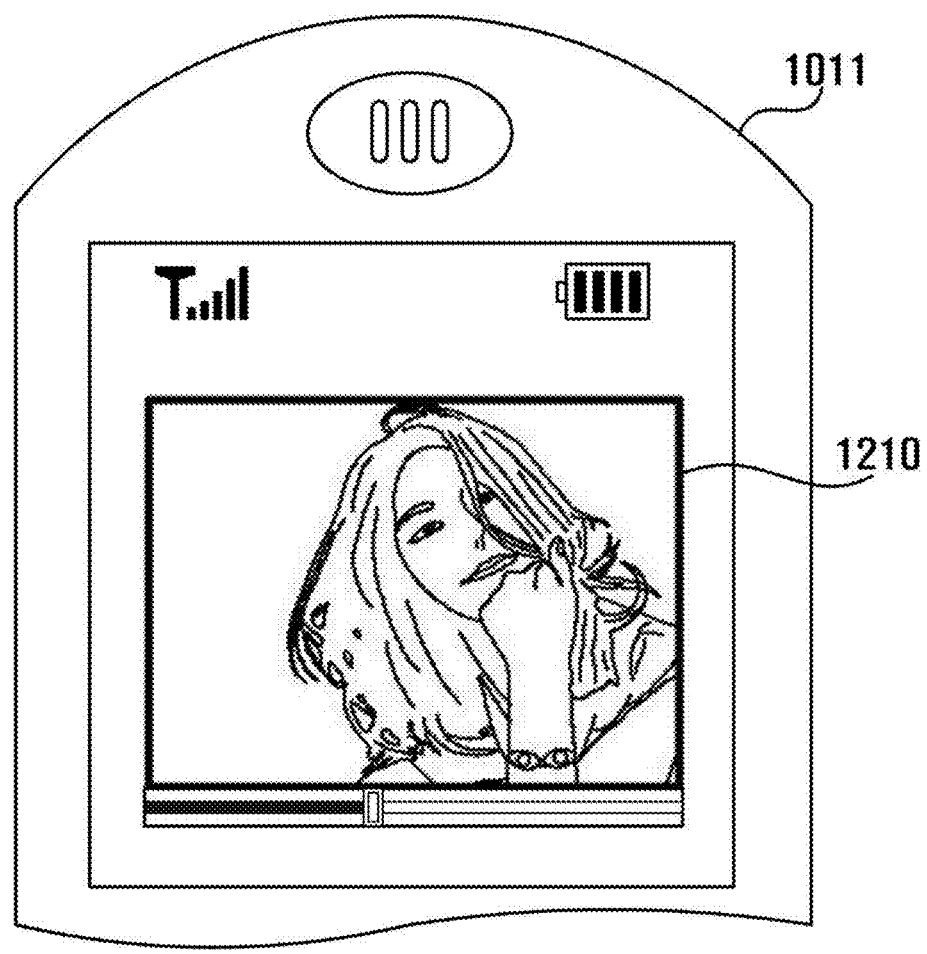
FIG. 12A is a diagram showing a state where a terminal is playing movie contents according to an exemplary embodiment of the present invention.
Figure 12B:
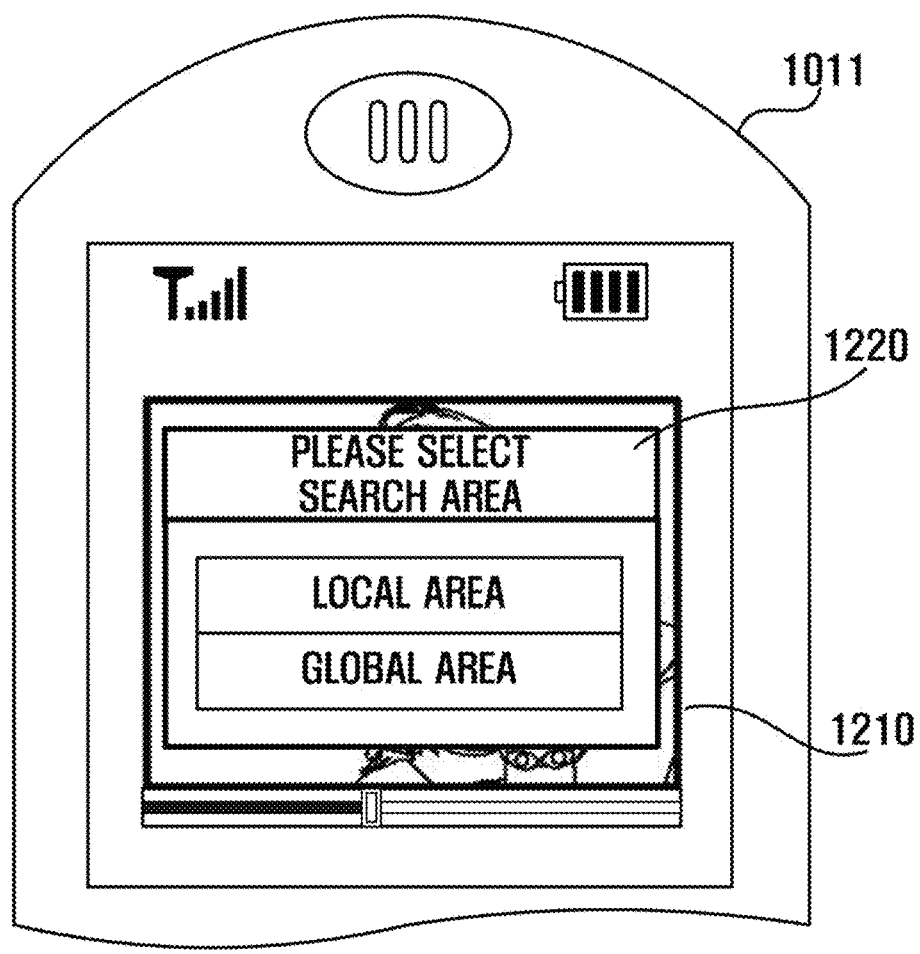
FIG. 12B is a diagram showing a search area selection screen according to an exemplary embodiment of the present invention.

If a terminal search request is input from the user while the contents is being played (Operation S1102), the terminal 1011 displays a search area selection screen (Operation S1103). For example, as shown in FIG. 12A, when the terminal search request of the user is input while the contents is being played, the terminal 1011 can display a search area selection screen shown in FIG. 12B. As shown in FIG. 12B, a search area can include a local area and a global area. Here, the global area includes a plurality of local areas. In the service system shown in FIG. 10, the global area includes the first local area and the second local area.

The user can select either the global area or the local area. If the user selects the search area (Operation S1104), the terminal 1011 displays the type of metadata related to the contents that is being played (Operation S1105).

The user can select the type of metadata as a search reference among the types of metadata that are displayed by the terminal 1011. If the user selects the type of metadata (Operation S1106), the terminal 1011 extracts a contents information element corresponding to the type of metadata selected by the user from the metadata of the contents that is being played (Operation S1107). It should be understood that Operations S1105 to S1107 of FIG. 11 are substantially the same as Operation S320 to S330 of FIG. 3.

Thereafter, the terminal 1011 generates a terminal search request message including information regarding the search area selected at Operation S1104 (hereinafter, referred to as "search area information") and the contents information element extracted at Operation S1107 (Operation S1108), and transmits the generated terminal search request message to the first service provision server 1020 (Operation S1109).

The first service provision server 1020 that receives the terminal search request message from the terminal 1011 judges, on the basis of the search area information included in the terminal search request message, which of the local area and the global area a service is provided to (Operation S1110). If the search area information represents the local area, a terminal search process is performed on the first local area that is handled by the first service provision server 1020. This processing is the substantially same as described with reference to FIGS. 3 to 5. Accordingly, description of an operation when the search area is set to the local area will be omitted.

As the judgment result at Operation S1110, if the search area information included in the terminal search request message represents the global area, the first service provision server 1020 transmits the terminal search request message to the relay server 1040 (Operation S1111). At this time, the terminal search request message to be transmitted may be received from the terminal 1011 or newly generated by the first service provision server 1020.

When receiving the terminal search request message transmitted from the first service provision server 1020, the relay server 1040 relays the terminal search request message to the second service provision server 1030 (Operation S1112).

The second service provision server 1030 searches a terminal, which is playing contents related to the contents information element included in the terminal search request message, among the terminals 1014, 1015, and 1016 connected thereto in the second local area, and collects positional information of the searched terminal (Operation S1113). It should be understood that Operation S1113 is substantially the same as described with reference to FIGS. 4 and 5.

The second service provision server 1030 can map the collected positional information to identification information of the corresponding terminal (Operation S1114). Thereafter, the second service provision server 1030 generates a reply message including the collected positional information (Operation S1115) and transmits the generated reply message to the relay server 1040 (Operation S1116). The reply message that is generated at Operation S1115 can include the identification information of the terminal mapped to the positional information.

The relay server 1040 relays the user search reply message received from the second service provision server 1030 to the first service provision server 1020 (Operation S1117).

The first service provision server 1020 searches a terminal, which is playing contents related to contents information element included in the terminal search request message, from the terminals 1012 and 1013 connected thereto in the first local area, and collects positional information of the searched terminal (Operation S1118). It should be understood that Operation S1118 is substantially the same as described with reference to FIGS. 5 and 6.

The first service provision server 1020 can map the collected positional information to identification information of the corresponding terminal (Operation S1119).

Thereafter, the first service provision server 1020 extracts the positional information from the reply message transmitted from the relay server 1040 (Operation S1120) and transmits the collected positional information and the positional information extracted at Operation S1120 to the terminal 1011 (Operation S1121). At Operation S1121, the identification information of the terminal mapped to the positional information may also be transmitted together with the positional information.

The terminal 1011 that receives the positional information from the first service provision server 1020 displays the received positional information (Operation S1122). It should be understood that Operation S1122 is substantially the same as Operation S360 of FIG. 3. Since the positions of the terminals are searched in the global area, if the positional information is displayed in a map format at Operation S1122, a map displayed at Operation S1122 can include the first local area and the second local area.

Figure 13A:
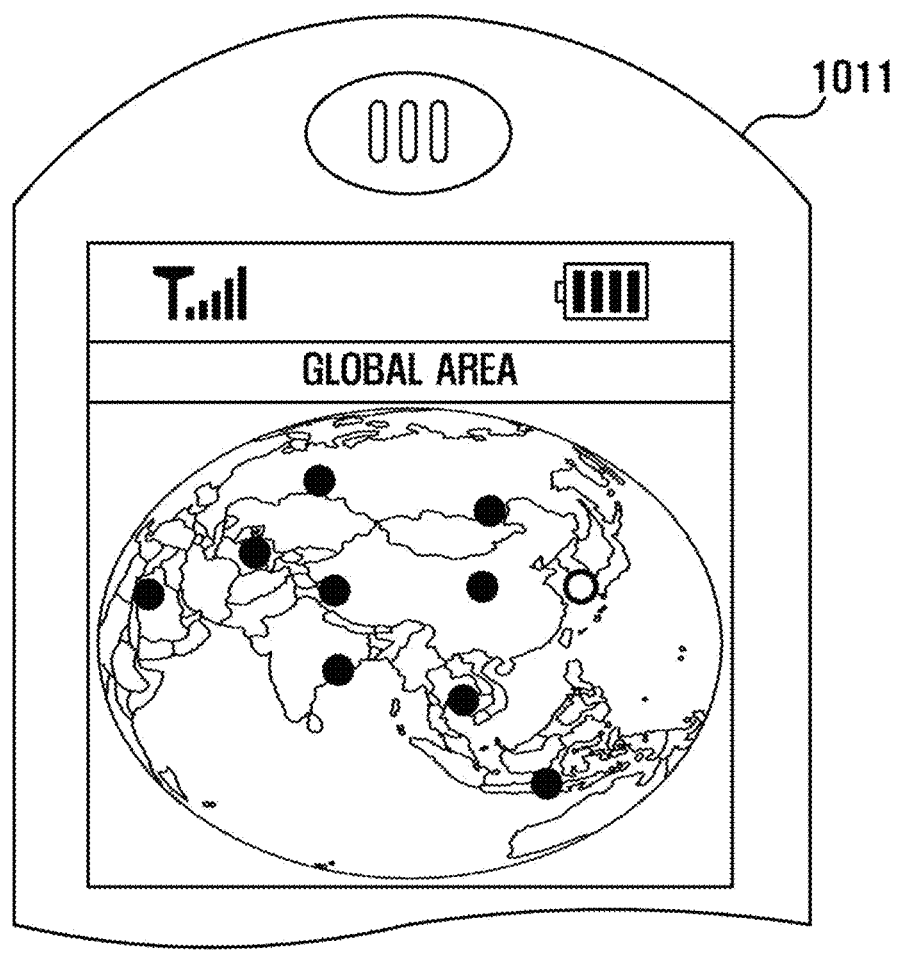
FIG. 13A is a diagram showing a state where a terminal according to an exemplary embodiment of the present invention is displaying positional information.

FIG. 13A shows an example of positional information displayed at Operation S1122 according to an exemplary embodiment, but is not limited to this example. For example, positional information may be displayed on the basis of each local area. That is, at Operation S1122 of FIG. 11, in respect to the positional information, the search result of the first local area and the search result of the second local area can be displayed alternately according to the user's request. This is exemplified in FIG. 13B. In this case, when the user selects "next local area", the terminal 1011 that is displaying the first local area 1320 can display the second local area 1330. The reverse processing can also be performed.

At Operation S1117 of FIG. 11, the relay server 1040 can temporarily store the positional information transmitted from the second service provision server 1030. If a terminal search request message including the same contents information element as that transmitted at Operation S1111 is received from the first service provision server 1020 before a critical time elapses from when the positional information is temporarily stored, the temporarily stored positional information can be transmitted to the first service provision server 1020. This is because, when the same request is received within a predetermined time, the substantially same effect can be obtained even if the previous processing result is provided without repeating the same processing. In this case, the relay server 1040 may not transmit the terminal search request message to the second service provision server 1030. With this processing, the processing time and load of the relay server 1040 can be reduced. This can be similarly applied to the first service provision server 1020. That is, the first service provision server 1020 may temporarily store the positional information that is transmitted to the terminal 1011 at Operation S1121 of FIG. 11 and, if the same terminal search request message as that transmitted from the terminal 1011 at Operation S1109 within a critical time from when the positional information is temporarily stored, may provide the temporarily stored positional information to the terminal 1011.

Hereinafter, the configuration of the terminals 112, 114, 116, 1011, 1012, 1013, 1014, 1015, or 1015, the configuration of the service provision servers 120, 1020, or 1030, and the configuration of the relay server 1040 will be described. The operations between them can be understood in detail with reference to FIGS. 1 to 12.

Figure 14:
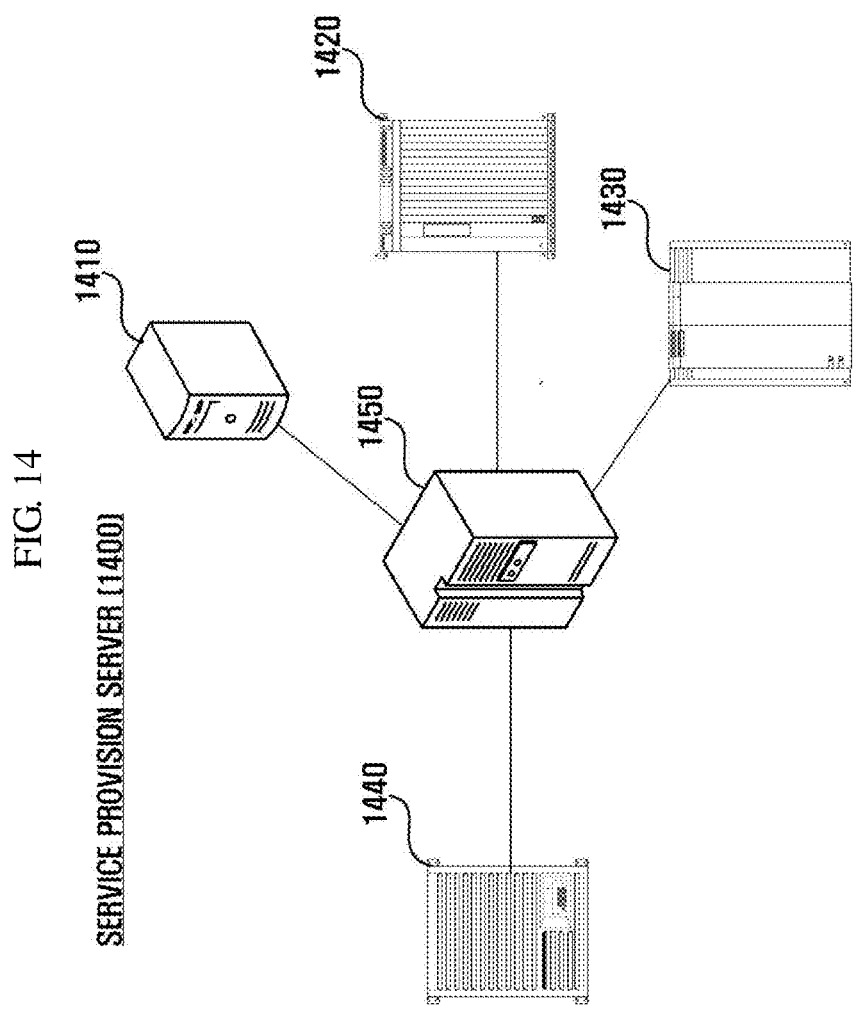
FIG. 14 is a diagram showing the configuration of a service provision server 1400 according to an exemplary embodiment of the present invention.

FIG. 14 is a diagram showing the configuration of the service provision server 1400 according to an exemplary embodiment. The service provision server 1400 has the same configuration as the service provision servers 120, 1020, and 1030 shown in FIGS. 1 and 10.

The service provision server 1400 includes a contents management device 1410, a connection management device 1420, a positional information management device 1430, a service processing device 1440, and a communication relay device 1450.

When receiving a contents request message from the terminal, the contents management device 1410 can provide the requested contents. A contents provision method may be a streaming method or a download method. Accordingly, the contents management device 1410 can confirm which terminal is receiving contents in the streaming method. Further, when receiving the contents search request message, the contents management device 1410 can search contents corresponding to the search keyword included in the contents search request message and create a list of the searched contents. To this end, the contents management device 1410 can store a plurality of contents and metadata of the contents. The contents management device 1410 may access an external contents provider and search and receive required contents and metadata.

The connection management device 1420 performs an authentication processing of the terminal that requests connection. To this end, the connection management device 1420 can receive predetermined registration information from the terminal, register the registration information, and, if authentication information is received from the terminal afterwards, compare the authentication information with the registration information to determine whether or not to admit the connection of the terminal. Further, the connection management device 1420 manages a list of terminals, which are currently connected to the service provision server 1400, and updates the list whenever connection/disconnection.

The positional information management device 1430 manages positional information of the terminals that are being connected to the service provision server 1400. As an example to manage the positional information of the terminal, the positional information management device 1430 can include at least one of a home location register and a visited location register. This is just illustrative. An additional device (for example, a GPS processing device) that can acquire the positional information of the terminal can be provided. The positional information management device 1430 may also manage an electronic map that is to be provided to the terminal.

As another example, the positional information management device 1430 may receive the positional information of the terminal regularly or irregularly from the terminal connected to the service provision server 1400 and manage the received positional information. For example but not by way of limitation, if the terminal connected to the service provision server 1400 transmits its own positional information to the service provision server 1400, the positional information management device 1430 can store and manage the transmitted positional information. Alternatively, the positional information management device 1430 may inquire of the terminal connected to the service provision server 1400 the positional information and acquire the positional information of the terminal from the terminal.

The service processing device 1440 serves as a gate for communication with the terminal or the relay server 1040. Further, the service processing device 1440 instructs the individual devices 1410, 1420, and 1430 of the service provision server 1400 to perform the required operations to provide a required service to the terminal. To this end, the service processing device 1440 can generate or analyze various messages required for communication with the terminal or the relay server. The message refers to an information transfer medium for various requests or replies, and it should not be limited to only the meaning of the term "message" itself. For example, the term "message" can be substituted with "frame" or "packet", or other term as would be understood by one skilled in the art.

The communication relay device 1450 relays communication between the terminals. Here, the communication can include an IM service, an SMS, a voice call, and an image call. To support various communication services, the communication relay device 1450 can include a plurality of communication service processing devices (not shown). For example, the communication relay device 1450 can include a short message processing device, an exchange, and the like.

Figure 15:
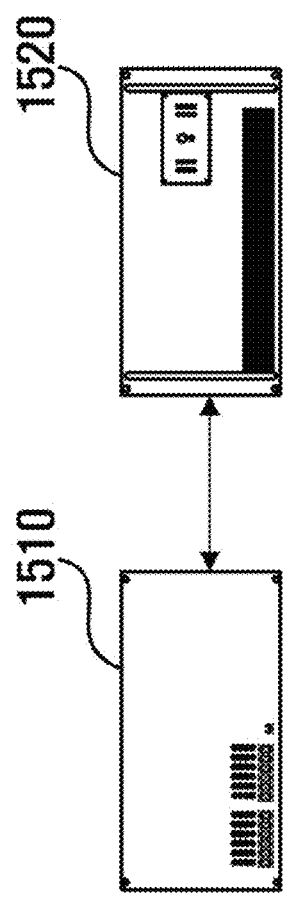
FIG. 15 is a diagram showing the configuration of a relay server 1040 according to an exemplary embodiment of the present invention.

FIG. 15 is a diagram showing the configuration of the relay server 1040 according to an exemplary embodiment. The relay server 1040 includes a proxy device 1510 that delivers a message to be transmitted from the service provision server to a different service provision server, and a management device 1520 that stores positional information transmitted from the service provision server. The management device 1520 may delete the stored positional information when a predetermined time elapses. Further, when the same terminal search request message is received from a specified service provision server again, the management device 1520 determines whether to reuse the temporarily stored positional information. For example, if a first terminal search request message is received from the first service provision server 1020, the proxy device 1510 transmits the received first terminal search request message to the second service provision server 1030. Thereafter, if a reply message including positional information is received from the second service provision server 1030, the proxy device 1510 transmits the received reply message to the first service provision server 1020. At this time, the management device 1520 can store the positional information included in the reply message. If a second terminal search request message including the same contents information element as the first terminal search request message is received from the first service provision server 1020 before a critical time elapses from when the positional information is stored, the management device 1520 can transmit the stored positional information to the first service provision server 1020. At this time, the management device 1520 can control the proxy device 1510 not to transmit the second terminal search request message to the second service provision server 1030.

Figure 16:
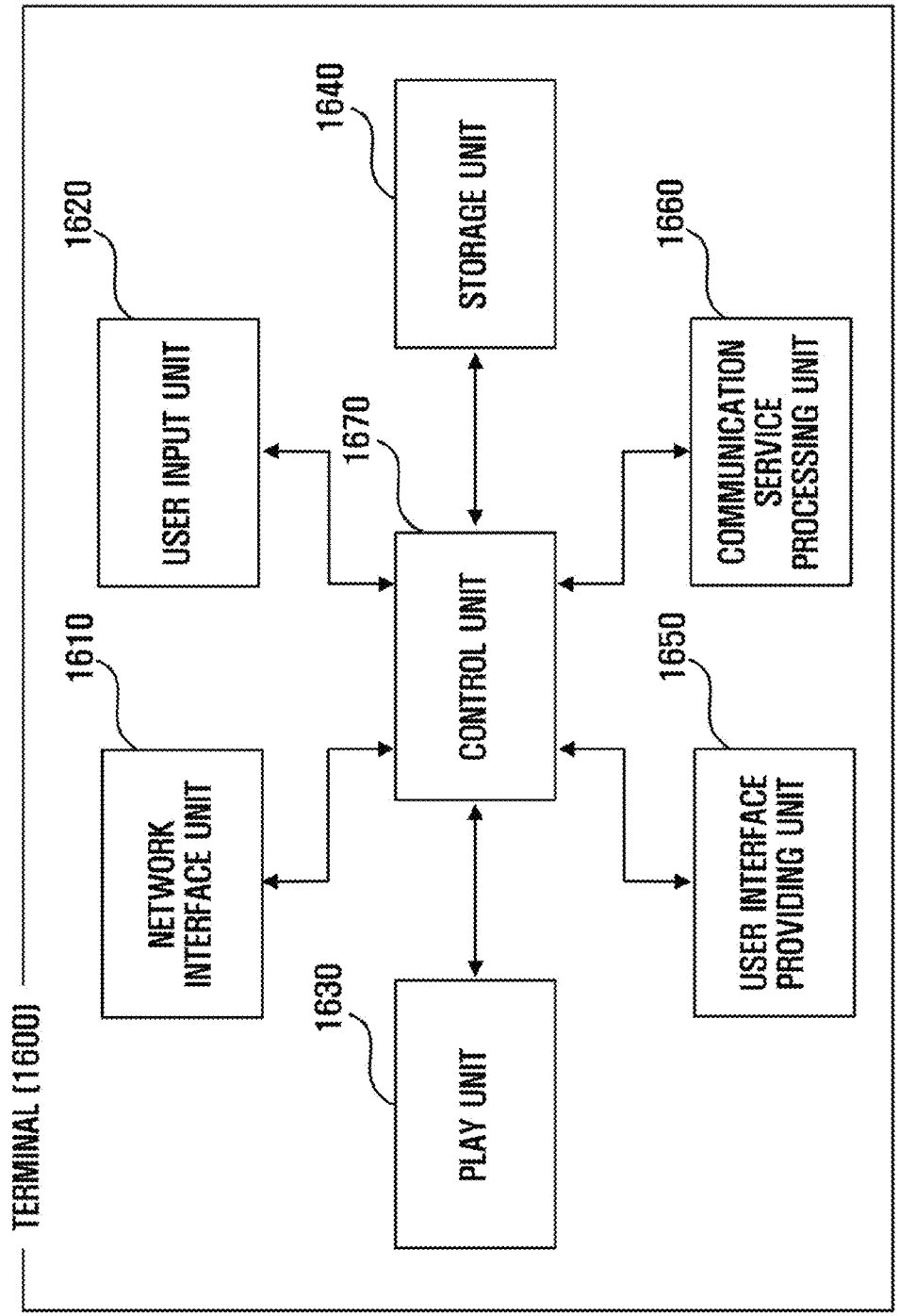
FIG. 16 is a diagram showing the configuration of a terminal 1600 according to an exemplary embodiment of the present invention.

FIG. 16 is a diagram showing the configuration of a terminal 1600 according to an exemplary embodiment. The terminals 112, 114, 116, 1011, 1012, 1013, 1014, 1015, and 1016 shown in FIGS. 1 and 10 may have the substantially same configuration as the terminal 1600 shown in FIG. 16.

The terminal 1600 includes a network interface unit 1610, a user input unit 1620, a play unit 1630, a storage unit 1640, a user interface providing unit 1650, a communication service processing unit 1660, and a control unit 1670.

The network interface unit 1610 performs communication with the service provision server 1400. That is, the network interface unit 1610 transmits and receives various messages, contents, positional information, and other data or information described with reference to FIGS. 1 to 12. The network interface unit 1610 can use a protocol based on CDMA, WCDMA, or GSM; however, the present invention is not limited thereto. For example, the network interface unit 1610 may use a communication protocol based on the IEEE 802.11 standard or the IEEE 802.15.3 standard or other different communication protocols.

The user input unit 1620 receives various requests or commands from the user. To this end, the user input unit 1620 can include an input unit, such as a keypad, a touch pad, or a touch screen.

The play unit 1630 plays various contents or a map including positional information. The play unit 1630 can include various kinds of codec or application processing units in order to play the contents or the map. For example, the play unit 1630 can include a video decoder based on moving picture decoding technology, such as Moving Picture Experts Group 2(MPEG2), MPEG4, or H.264, or an audio decoder based on audio decoding technology, such as MPEG Audio Layer-3 (MP3) or Window Media Audio (WMA).

The storage unit 1640 stores contents, positional information, and other data. The storage unit 1640 can include various kinds of memories, such as a hard disk, a flash memory, a Read Only Memory (ROM), and a Random Access Memory (RAM).

The user interface providing unit 1650 provides various kinds of user interfaces in order to guide the use of the service. For example, the user interface providing unit 1650 can provide a metadata type selection screen shown in FIG. 4B, a search area selection screen shown in FIG. 12B, and the like.

The communication service processing unit 1660 supports various kinds of communication services, such as an IM service, an SMS, a voice call, and an image call.

The control unit 1670 controls the operations of the components constituting the terminal 1600. Further, the control unit 1670 can generate various kinds of messages to be transmitted to the service provision server 1400 and analyze various kinds of messages to be received from the service provision server 1400.

In addition, though not specifically described in the description of the terminal 1600 with reference to FIG. 16, the control unit 1670 can perform a processing necessary for providing the service with reference to FIG. 1 to FIG. 13B.

Though not shown, the terminal 1600 may further include a positional information management unit that manages its own positional information. According to an exemplary embodiment, the positional information management unit may include a GPS processing unit that receives and stores the positional information of the terminal 1600 through a GPS satellite.

The individual components of the terminal 1600 that has been described with reference to FIG. 16 can be implemented by a module. The term "module", as used herein, means, but is not limited to, a software or hardware component, such as a Field Programmable Gate Array (FPGA) or Application Specific Integrated Circuit (ASIC), which performs certain tasks. A module may be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

According to the service provision method for user search, and the apparatus, the server, and the system for the same of the present invention, it is possible to provide a service that can search users, who use similar contents, in real time and allows information exchange with the searched users.

What is claimed is:

1. A terminal communication method performed by a first terminal, the method comprising:
   reproducing a first content on the first terminal;
   receiving user input to search for another terminal reproducing content related to the first content, while reproducing the first content on the first terminal;
   transmitting a search request to search for another terminal reproducing content related to the first content, the search request comprising metadata of the first content;
   receiving a search result based on the metadata of the first content that identifies a second terminal reproducing a second content related to the first content, the search result comprising positional information of the second terminal reproducing the second content; and
   displaying the search result.

2. The terminal communication method of claim 1, further comprising:
   establishing communication with the second terminal, based on the search result.

3. The terminal communication method of claim 1, wherein the receiving comprises receiving the search result, while reproducing the first content on the first terminal.

4. The terminal communication method of claim 2, wherein the communication comprises at least one of an instant messaging service, a short messaging service, a voice-based call, and a video-based call.

5. The terminal communication method of claim 1, wherein the search result comprises an identity of the second terminal.

6. The terminal communication method of claim 5, wherein the identity of the second terminal comprises an identity of a user of the second terminal.

7. The terminal communication method of claim 1, wherein the positional information comprises a location of the second terminal.

8. The terminal communication method of claim 7, wherein the location of the second terminal comprises a geographic location relative to a location of the first terminal.

9. A digital device comprising:
   a processor configured to reproduce a first content;
   a user interface configured to receive user input to search for another terminal reproducing content related to the first content, while the processor reproduces the first content;
   a network interface unit configured to transmit a terminal search request to search for another terminal reproducing content related to the first content, the terminal search request comprising metadata of the first content, and to receive a search result based on the metadata of the first content that identifies a second terminal reproducing a second content related to the first content, the search result comprising positional information of the second terminal reproducing the second content; and
   a display unit configured to display the search result.

10. The digital device of claim 9, further comprising:
    a communication service processing unit configured to establish communication with the second terminal, based on the search result.

11. The digital device of claim 9, wherein the network interface unit is further configured to receive the search result, while the processor is reproducing the first content.

12. The digital device of claim 10, wherein the communication comprises at least one of an instant messaging service, a short messaging service, a voice-based call, and a video-based call.

13. The digital device of claim 9, wherein the search result comprises an identity of the second terminal.

14. The digital device of claim 13, wherein the identity of the second terminal comprises an identity of a user of the second terminal.

15. The digital device of claim 9, wherein the positional information comprises a location of the second terminal.

16. The digital device of claim 15, wherein the location of the second terminal is a geographic location relative to a location of the first terminal.

17. The digital device of claim 9, wherein the second terminal is determined by a service provision server from among a plurality of terminals which transmit metadata of the second content to the service providing server or which play the second content in a streaming method.

18. The terminal communication method of claim 12, wherein the second terminal identified in the search result is in a state in which the second terminal plays the second content in relation to the first content, and wherein the search result comprises a plurality of second terminals including the second terminal, and the first terminal selects the second terminal from among the plurality of second terminals.

19. The digital device of claim 9, wherein the second terminal identified in the search result is in a state in which the second terminal plays the second content in relation to the first content, and wherein the search result comprises a plurality of second terminals including the second terminal, and the digital device selects the second terminal from among the plurality of second terminals.

* * * * *